(12) United States Patent
Baresich

(10) Patent No.: US 6,276,656 B1
(45) Date of Patent: Aug. 21, 2001

(54) MOLD FOR OPTIMIZING COOLING TIME TO FORM MOLDED ARTICLE

(75) Inventor: Frank J. Baresich, Melbourne Beach, FL (US)

(73) Assignee: Thermal Wave Molding Corp., Aventura, FL (US)

( * ) Notice: Subject to any disclaimer, the term of this patent is extended or adjusted under 35 U.S.C. 154(b) by 0 days.

(21) Appl. No.: 09/421,189

(22) Filed: Oct. 19, 1999

Related U.S. Application Data

(63) Continuation-in-part of application No. 08/857,762, filed on May 15, 1997, now Pat. No. 6,019,930, which is a continuation-in-part of application No. 08/516,100, filed on Aug. 17, 1995, now abandoned, which is a continuation of application No. 07/913,136, filed on Jul. 14, 1992, now abandoned.

(51) Int. Cl.$^7$ .................................................. B29C 45/73
(52) U.S. Cl. .............................. 249/79; 249/80; 249/134; 264/1.33; 425/547; 425/548
(58) Field of Search .................... 249/114.1, 117, 249/134, 79, 80; 264/1.33, 327, 328.16; 425/547, 552, 548

(56) References Cited

U.S. PATENT DOCUMENTS

| | | | |
|---|---|---|---|
| 3,619,449 | 11/1971 | Berard | 264/106 |
| 3,734,449 | 5/1973 | Itou et al. | 249/114 |

(List continued on next page.)

OTHER PUBLICATIONS

Martin, M.G., et al., Class "A" Blow Molding: How It's Done, Plastics Technology, Jun. 1988, pp. 149–151.

Liou, M. et, al., Minimizing Residual Stresses in Molded Parts, Antec 1988, pp. 524–528.
Rubin, I., Injection Molding, Theory and Practice, p. 156.

*Primary Examiner*—Mathieu D. Vargot
(74) *Attorney, Agent, or Firm*—Duane, Morris & Heckscher LLP

(57) ABSTRACT

Mold cycle time is accelerated by employing thermally insulating surface temperature boosters, which are of a minimum thickness to promote cooling by heat transfer through the boosters. According to the thermal transfer properties of the insulating boosters and the respective temperatures of the molten material and the dies, the temperature of the cavity surface is raised by contact with the molten material to equal or exceed the temperature required to produce a molded article, preferably just until the time that the mold is fully filled. Heat transfer through the boosters to the dies then cools and solidifies the molded article until it can be removed from the mold. The temperature boosters result in increased cavity surface temperatures, such that the mold dies can be kept at substantially lower temperatures. The overall result is a reduction in mold cooling time and therefore acceleration of mold cycling. When the molded article is an optical disc, where the digital information is transferred to at least a part of a surface of the optical disc from a stamper that forms at least a part of the cavity surfaces, a stamper heating means can be used to improve the quality of optical performance. Typically, the stamper may contact high thermal conductivity materials at or beyond the outside diameter of the mold cavity, creating a path for the heat to flow from and cool the outer edge of the optical disc excessively. Transfer of the pits from the stamper is more difficult in the cooler material at the outer edge of the disc, reducing pit quality, and stresses are also created at the outer edge of the disc which cause birefringence, resulting in reduced optical performance. The stamper heating means increases the temperature of the stamper at the area of contact enough to reduce, stop, or even reverse the direction of the heat flow.

14 Claims, 9 Drawing Sheets

U.S. PATENT DOCUMENTS

| | | | |
|---|---|---|---|
| 4,018,860 | 4/1977 | Farrell | 264/39 |
| 4,139,177 | 2/1979 | Hanning | 249/66 |
| 4,164,523 | 8/1979 | Hanning | 264/28 |
| 4,208,177 | 6/1980 | Allen | 425/404 |
| 4,268,465 | 5/1981 | Suh et al. | 264/25 |
| 4,275,864 | 6/1981 | Richards | 249/79 |
| 4,285,901 | 8/1981 | Yotsutsuji et al. | 264/225 |
| 4,338,068 | 7/1982 | Suh et al. | 425/144 |
| 4,340,551 | 7/1982 | Wada et al. | 264/25 |
| 4,364,878 | 12/1982 | Laliberte et al. | 264/2.2 |
| 4,518,549 | 5/1985 | Hart | 264/39 |
| 4,622,001 | 11/1986 | Bright et al. | 425/549 |
| 4,623,497 | 11/1986 | Waters | 264/40.6 |
| 4,655,280 | 4/1987 | Takahashi | 165/47 |
| 4,703,912 | 11/1987 | Aoki | 249/81 |
| 4,836,960 | 6/1989 | Spector et al. | 264/2.2 |
| 4,934,918 | 6/1990 | Outland | 425/144 |
| 5,041,247 | 8/1991 | Kim | 264/37 |
| 5,064,597 | 11/1991 | Kim | 264/219 |

MOLD FOR OPTIMIZING COOLING TIME TO FORM MOLDED ARTICLE

CROSS REFERENCE TO RELATED APPLICATIONS

This is a continuation in part of application Ser. No. 08/857,762, filed May 15, 1997, now issued as U.S. Pat. No. 6,019,930 which is a continuation in part of pending application Ser. No. 08/516,100, filed Aug. 17, 1995, now abandoned which is a continuation of application Ser. No. 07/913,136, filed Jul. 14, 1992, now abandoned.

BACKGROUND OF THE INVENTION

1. Field of the Invention

This invention relates to the field of methods and apparatus for molding molten material, and in particular provides a mold structure and method for reducing and preferably minimizing the time needed to cool the molten material to a temperature at which the molded article is rigid enough for removal from the mold. This is accomplished by controlling the rate of heat transfer from the molten material to the mold body using thermally insulating surface temperature boosters. According to the invention, thermal insulation is embodied according to its thickness and heat transfer properties to maximize the rate of cooling within certain limits such that the material cools substantially to its solidifying temperature promptly upon completion of filling of the mold.

2. Prior Art

Production molds and molding processes may produce hundreds of molded articles an hour. Most of these processes apply pressure to cause a hot molten material to flow into and fill a mold cavity. The material cools in the shape of the cavity until it is rigid enough for removal before the mold opens and the operator or special equipment removes the article from the mold.

Production efficiency dictates that each molding operation should be completed in as short a time as possible in order to make the mold available for another molding cycle. For this reason, molders normally try to cool the molten material as fast as possible. Often heat transfer fluid is circulated through passages in the mold dies to control the cavity surface temperature. U.S. Pat. Nos. 4,275,864, 4,655,280,4,703,912, and 4,934,918 describe some ways to provide flow passages. Heat flows from the molten material through the mold die to the heat transfer fluid. Metals such as H-13, H-23, P-i, P-2, P-4, P-S, P-6, P-20, and S7 tool steels, 420 stainless steel, beryllium copper, brass, and aluminum are common mold materials whose high thermal conductivities cause heat to flow at a high rate. Irvin I. Rubin on page 156 of "Injection Molding Theory and Practice," explains why high thermal conductivity materials should be chosen for molds.

To remove heat from the molten material rapidly, molders normally keep cavity surfaces much colder than the molten material throughout the molding cycle. However, if cavity surfaces are kept too cold while the mold is filling, the mold may not fill completely (short shot) or unacceptable surface defects or stresses may develop in the molded article. In addition, locations distant from the location where the molten material enters the cavity may get less material than closer locations. This causes uneven density distribution and molded-in stresses.

The molten material tends to heat the mold. However, if the mold is kept at a relatively higher temperature, the mold generally can be filled more dependably because the molten material is more flowable, and the quality of the molded article is improved. The need for additional cooling can add to the time spent in molding each article as compared to keeping the mold cooler initially. What is needed is a method to optimize temperature control to balance the interests of quality and time for a given molding process.

The minimum cavity surface temperature required during mold filling depends on the particular molten material and the surface quality and dimensional stability required of the molded article. Processing temperature ranges for molten material and for mold dies are specified by the equipment and material manufacturers. For plastics, the recommended temperature ranges for mold dies are below the solidifying temperatures of the plastics. For many materials recommended temperature ranges can also be found in sources such as "Modem Plastics Encyclopedia," MIL-HDBK-700A "Plastics," the annual "Materials Selector" issues of "Materials Engineering Magazine," "Metals Handbook," "Glass Engineering Handbook," and "Kirk-Othmer: Encyclopedia of Chemical Technology Volume 11, third edition" (for glass see pages 825–832 & 855–857).

Because defects that may be acceptable for one type of molded article may not be acceptable for another, and because mold heating and cooling configurations vary, the optimum temperature for molding a specific article normally is determined in part by analysis and in part by experiment and experience (i.e., trial and error). Most often the optimum temperatures fall within the temperature ranges recommended by the material manufacturer.

When a molten material contacts surfaces of a cavity, heat flow from the molten material causes a rapid increase of the cavity surface temperatures. For example, molten polycarbonate at 600° F. and cavity surfaces initially at 195° F. will produce the following approximate temperature increases for cavity surfaces made of common mold die metals. These increases are approximate because convection, radiation, thermal contact resistances, changes in thermal physical properties with temperature, and initial temperature gradients can vary.

| Cavity Surface Material | Temperature Increase |
| --- | --- |
| 420 stainless steel | 29° F. |
| H-13 tool steel | 26° F. |
| brass | 14° F. |
| aluminum | 12° F. |

The small temperature increases at cavity surfaces of common metal cavities demand that molders maintain the surfaces of the cavity close to the mold filling temperatures throughout the molding cycle. Otherwise, the required temperatures cannot be reached at the cavity surfaces while the mold is filling. However, keeping the cavity surfaces so close to the mold filling temperatures after the cavity is full slows heat transfer from the molten material into the dies and delays solidifying of the workpiece. If die temperature is cycled instead, heating and cooling the entire mass of dies requires additional time that also slows the molding process.

The cavity surface temperature and the rate of cooling affect the finished workpiece. It is know, for example, deliberately to increase cooling time to improve surface qualities of the molded article such as smoothness, gloss, and replication of cavity surface finish.

DuPont Company developed a method for cycling the temperature of mold dies to improve the smoothness of molded surfaces. It is described in the article, "Class "A" Blow Molding: How It's Done," Plastics Technology, June, 1988. The method reduces the thermal mass of the mold dies then alternately circulates heating and cooling fluid through passages in the dies. This requires extensive structural analysis and machining in addition to computer controlled dual fluid circuits. DuPont reports that the process meets its goal to improve the surface of molded automobile spoilers. However, DuPont also states it increases the cycle time.

Others improve the surface quality of plastic articles by heating a thin layer of the cavity surface rather than the entire die. U.S. Pat. No. 4,340,551 discloses high-frequency induction to heat a superficial layer of the cavity surface before injecting plastic resin. Steps to insert the induction heater, close the mold, heat the cavity surface, open the mold, and remove the induction heater increase the cycle time. U.S. Pat. Nos. 3,734,449, 4,285,901, 5,041,247, and 5,064,597 locate a thin layer of metal backed by a thermal insulation layer at the cavity surface. The insulation layer reduces heat flow from the metal layer. The result is a substantially higher temperature of the metal cavity surface, so that it is above the point at which the resin solidifies while the mold cavity is filling. The high temperature and restricted heat transfer keep the surface of the plastic article fluid and improve transfer of the finish of the very hot surface of the cavity to the plastic article. The increased cavity surface temperature and restricted heat transfer increase cooling time. M. Liou and N. Suh in their article, "Minimizing Residual Stresses in Molded Parts," pages 524 through 528, ANTEC '88, report that coating a cavity surface with 0.01 centimeter of Teflon caused higher cavity surface temperatures that increased cooling time almost twenty percent.

To reduce cooling time, inventors have applied cooling fluid directly to the surface of a mold cavity. U.S. Pat. Nos. 4,139,177 and 4,164,523 reduce the cooling time of thick foam articles by flowing low boiling point liquid between the article and the cavity surface. The compressibility of foam allows space for the liquid to flow. The method is limited to molding foamed plastic articles, and at least two of the preferred liquids, namely carbon dioxide and liquid nitrogen, can pose safety hazards. The extreme cold temperatures of these liquids can cause skin damage, and the gases from the boiling liquid can displace air in the work place. U.S. Pat. No. 4,208,177 flows cooling fluid at or about five pounds per square inch pressure into a porous layer at the cavity surface. A vacuum is then pulled on the side of the porous layer that is away from the resin. The vacuum causes the fluid to boil, which draws heat from the porous layer and resin. However, the pores limit the quality of surface finishes on the molded article. Methods that rely on direct contact of low boiling point fluid with the cavity surfaces require expensive equipment and complicated controls.

U.S. Pat. No. 5,458,818 ('818 patent) uses a varying density insulating insert behind a stamper. The '818 patent claims to improve the surface smoothness of molded part by bringing the temperature of the cavity surface formed by the stamper above the solidifying temperature of the resin while the mold is filling. The '818 patent also claims to reduce residual stresses and pit replication. However, there is no suggestion in the '818 patent to lower the temperature of the mold die. Rather, the cooling time will increase due to the higher cavity surface temperature.

U.S. Pat. No. 5,041,247 ('247 patent) teaches the method of blow molding and shows a mold having a blow pin, a circular shaped die, a hard skin, an insulating layer, and a base. The hard skin is 1–20 mils thick and has a high thermal conductivity ($1 \times 10^{-2}$ to $1 \times 10^{-1}$ cal/sec-cm-C). Materials such as stainless steel, nickel, aluminum, and brass are used which are contrary to the primary booster materials used in my invention. The thickness of the insulating layer is determined by an equation where the only variable is thermal diffusivity while the thickness of my primary booster is determined by an equation which has both thermal diffusivity and cavity fill time as its variables. In the '247 patent, the skin surface is heated by the melt to above the glass transition (solidifying) temperature of the melt to duplicate the mold surface. Increases in the thickness of the insulating layer are shown to increase cooling time. There is no suggestion to reduce the mold die coolant temperature. The cooling time will be increased compared to a mold without an insulating layer. My mold selects booster thicknesses and mold die temperatures which shorten cooling time.

U.S. Pat. No. 5,064,597 ('597) teaches the method of compression molding, showing a hard skin layer, an insulating layer, and a base containing cooling means. The hard skin layer has the same thermal conductivity requirements as the '247 patent. The insulation layer thickness is determined using the same equation as the '247 patent. The thermal conductivity range for the insulating layer is $5 \times 10^{-4}$ to $5 \times 10^{-3}$ cal/sec-cm-C. However, some of the primary boosters of my invention can be made of materials such as sapphire and zirconia which have higher thermal conductivity. In the '597 patent, the surface of the cavity is brought to a temperature that keeps the plastic molten while the press closes when the mold is filled. It discloses that in one case, the cycle time is increased from 45–60 seconds to 2.2 minutes.

U.S. Pat. No. 5,124,192 ('192 patent) shows a hard continuous skin layer over an insulating layer and covers the mold design and construction to avoid delamination between the layers. The '192 patent operates similarly to the '247 and the '597 patents.

U.S. Pat. No. 5,176,839 ('839 patent) uses an insulating layer of varying density across its thickness. In the '839 patent, the insulating layer causes the skin layer to reheat in the same manner as the '192, '247 and the '597 patents.

In summary, the teachings of the prior art:

a. maintain the cavity surfaces close to the temperatures required during mold filling throughout the molding cycle, which prolongs cooling; or, b. to improve surface quality of a molded article, increase the temperature of cavity surfaces above the solidifying temperature of a plastic being molded while the cavity is filling, which lengthens cooling time even more; and/or, c. cycle the temperatures of entire mold dies, which requires expensive and complicated equipment; or, d. accelerate cooling by bringing fluid into direct contact with cavity surfaces which requires complex equipment and can degrade the molded article. The extremely cold liquids used for one of these methods present safety hazards and the method is limited to foamed resin.

SUMMARY OF THE INVENTION

It is an object of this invention to provide molding methods and molding apparatus that reduce the time required to cool material from a molten state into a molded article that is stiff enough that it can be removed from a mold. This invention can produce molded articles that are as good or better than those produced by conventional methods. It can be used to mold both foamed and unfoamed materials, and to mold thermoplastic, ceramics, glasses and metals. The invention provides a method and apparatus to optimally cycle cavity surface temperatures, without expensive and complicated equipment and controls. While the mold is filling, dies with temperature boosters at the cavity surface cause heat flowing from the molten material to the boosters to bring the cavity surfaces to or above temperatures required to produce a molded article. Dies with temperature boosters increase cavity surface temperatures so much more than the same dies without temperature boosters that the mold dies can be kept at substantially lower temperatures. According to an aspect of the invention, the boosters are made to a minimum thickness. The thickness preferably is chosen such that, starting when the cavity is approximately full, heat flowing from the boosters to the cooler dies causes cooling of cavity surfaces sufficient to cool, stiffen and solidify the molten material into an article rigid enough for removal from a mold, in a minimum time.

A method of this invention for accelerating cooling of molten material into a molded article comprises the steps of:
(a) providing a mold containing a plurality of mold portions which are brought together to form a mold cavity in the shape of said molded article, said mold portions comprising:
  (1) at least one die having at least one primary booster adjacent to and in thermal communication therewith, said die providing structural support for said booster;
  (2) said primary boosters forming at least a part of the surfaces of said mold cavity, the primary boosters being made of materials whose mathematical products of thermal conductivity, density, and specific heat are no more than $2.0 \times 10^4$ BTU$^2$/sec/in$^4$/° F.$^2$ at room temperature, and having predetermined thicknesses ($W_b$) as calculated from the equation $$W_b = Y \sqrt{\frac{k_b t_f}{\rho_b c_b}} \quad 0.25 \le Y \le 4.0$$

where $t_f$ is the time to fill the mold, $k_b$ is the thermal conductivity, $\rho_b$ is the density, and $c_b$ is the specific heat of the booster;
  (3) controlling a temperature control stimuli to the die;
(b) applying substantially constant temperature control stimuli to said mold dies such that surfaces of the mold cavity are at predetermined temperatures that are initially below the temperatures required to produce a molded article and which will, upon contact with molten material to be introduced into the mold cavity, increase to or above the temperatures required during mold filling to produce a molded article, and wherein, because of the mathematical products of thermal conductivity, density, and specific heat of the primary boosters the predetermined cavity surface and die temperatures are lower than when materials with higher corresponding products are used for cavity surfaces, such as when the same die is used without the primary boosters;
(c) introducing molten material into the mold cavity, whereupon the molten material heats the primary boosters and temperatures of the surfaces of the cavity increase from the predetermined temperatures to or above the mold filling temperatures required to produce a molded article;
(d) while the cavity is filling with molten material, maintaining said mold cavity surfaces at or above the temperatures required to produce a molded article;
(e) after the cavity is approximately fill, allowing heat flowing from the boosters to the cooler dies to cool cavity surfaces of the primary boosters, thereby cooling, stiffening, and solidifying the molten material in an accelerated manner, until it is rigid enough for removal from the mold.

Further methods and apparatus of the present invention utilize secondary boosters between primary boosters and dies where they are in thermal communications with both. The primary and secondary boosters cooperatively bring the temperatures of cavity surfaces to or above the temperatures required to produce a molded article. The secondary boosters are made to predetermined thicknesses of materials whose mathematical products of thermal conductivity, density, and specific heat are less than those of the primary boosters, whereby they restrict heat flow from the primary boosters causing heat flowing from the molten material to build up within the primary boosters. This increases temperatures of cavity surfaces.

When the molded article is an optical disc, where the digital information is transfered to at least a part of a surface of the optical disc from a stamper that forms at least a part of the cavity surfaces and is in thermal communication with at least one primary booster, a stamper heating means can be used to improve the quality of optical performance. The stamper may extend beyond the primary temperature booster. It may also contact high thermal conductivity materials at or beyond the outside diameter of the mold cavity, creating a path for the heat to flow from and cool the outer edge of the optical disc excessively. Transfer of the pits from the stamper is more difficult in the cooler material at the outer edge of the disc reducing pit quality, which is detrimental to optical performance. Stresses are also created at the outer edge of the disc which cause birefringence that is also detrimental to optical performance. The stamper heating means overcomes this problem.

The stamper heating means located in the die and in the vicinity adjacent to the periphery of the primary temperature booster, and in thermal contact with the stamper increases the temperature of the stamper at the area of contact enough to reduce, stop, or even reverse the direction of heat flow. Alternatively, the stamper heating means may be located in the mold die of an optical disc mold in a vicinity of an outer diameter of the cavity and in thermal communication with the stamper. Thermal contact between the heater and stamper may be accomplished directly or through an intermediary material of high thermal conductivity. Preferably, the heating means should have some thermal insulation from the mold die. The stamper heating means could also be of the electrical resistive heating type. By utilizing the stamper heating means, the birefringence at the outer edge of the optical disc is thus brought into acceptable limits.

Further objects and advantages of this invention will become apparent from a consideration of the drawings and ensuing descriptions.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
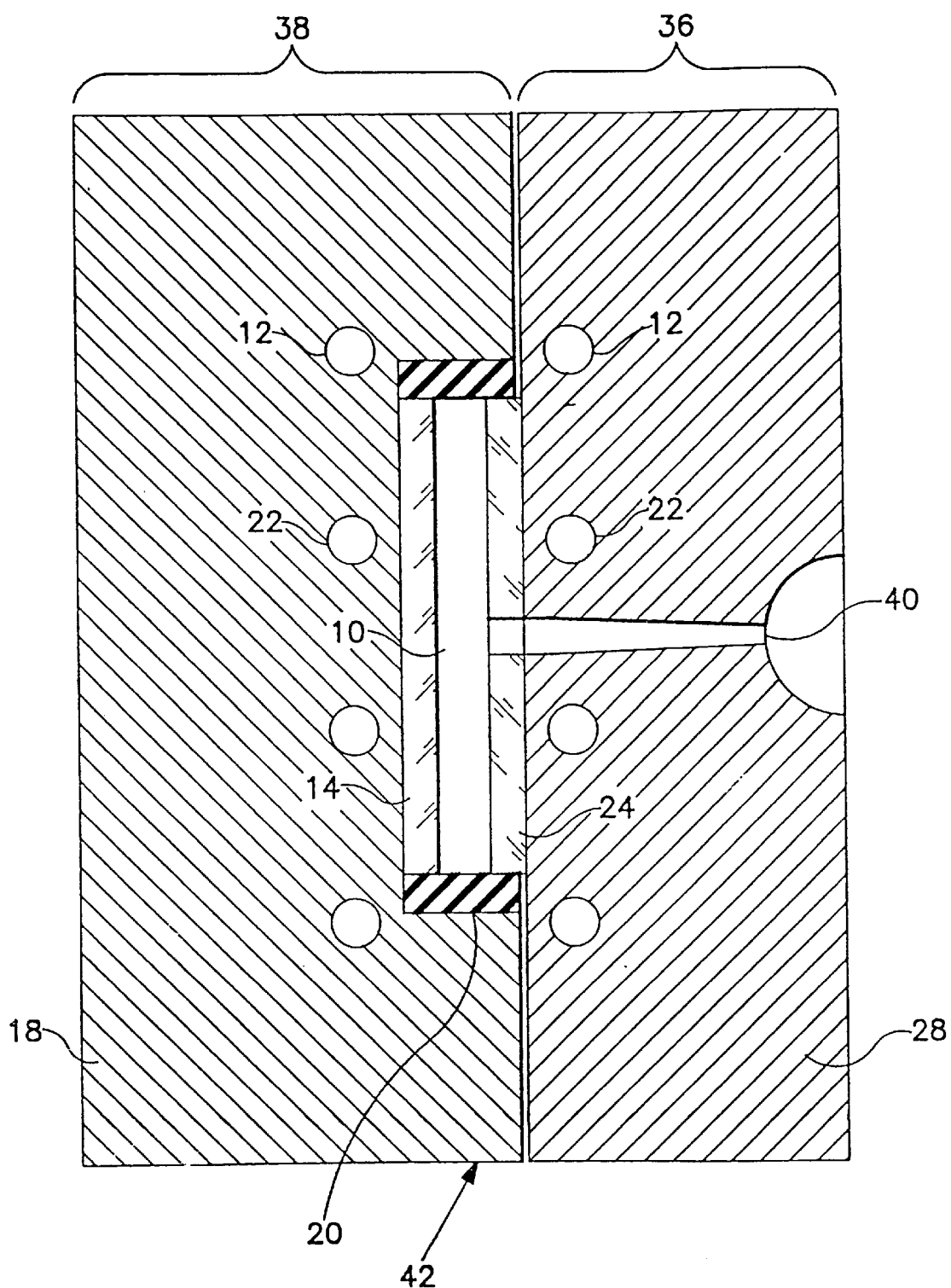
FIG. 1 is a cross-section of a mold according to the first embodiment of the invention.

FIG. 1 shows a simplified cross-section of a first embodiment mold 42 for a molded article.

A left-side element 38 comprises left-side primary temperature booster 14, edge temperature booster 20, and left-side die 18. Boosters 14 and 20 define at least a part of the surfaces of cavity 10.

Boosters 14 are made of materials that have the required durability at the temperatures and pressures at which they must operate, and whose mathematical products (kρc) of thermal conductivity (k), density (ρ), and specific heat (c) are no more than $2.0 \times 10^{-6}$ $BTU^2/sec/in^4/°F.^2$ at room temperature, and preferably no more than $1.6 \times 10^{-6}$ $BTU^2/sec/in^4/°F.^2$. This is much less than corresponding kρc products for the common mold metals discussed earlier. For example, the corresponding kρc product is about $9.2 \times 10^{-6}$ $BTU^2/sec/in^4/°F.^2$ for 420 stainless steel, and $55.6 \times 10^{-6}$ $BTL^2/sec/in^4I/°F.^2$ for an aluminum. The purpose of boosters 14 is to permit the temperature of the cavity surface to cycle, but the surface is only as hot as necessary to allow complete filling of the cavity and shaping of the molten material while the cavity is being filled. Promptly after filling is substantially complete, and no additional heat is being introduced into the cavity by the molten material, heat transfer from the boosters to the relatively cooler dies cools the cavity and its contents.

The booster allows the die and the cavity surfaces to be maintained at initial temperatures just before mold filling which are significantly below the temperatures that would be required of the same die and cavity surfaces without a booster. The die with the boosters still reaches and maintains a sufficient mold cavity surface temperature during filling of the cavity to achieve proper molding and complete filling of the cavity to form the molded article at the pressure being employed. By minimizing the thickness of the boosters as provided herein, molding time is also minimized at the same time.

When the temperatures are expressed in degrees fahrenheit, the initial cavity surface temperature with a booster is at least 20% lower than the temperature required at the mold surface during filling of the cavity. I have also discovered that this percentage increases when the kρc of the molten material is larger, when the kρc of the booster is smaller, and when the ratio of the temperature of molten material to the temperature of the cavity surface during mold filling is larger. The boosters cause heat from the molten material entering the cavity to substantially instantaneously raise the surface temperatures of the cavity to or above that required to properly fill the mold and to form the article. Then after the cavity is approximately full, the relatively cooler die temperature used in the present method accelerates cooling, stiffening, and solidifying of the molten material in the form of the article. Thus the time required for cooling of the cavity before the article can be removed is significantly reduced by the method of the invention as compared to the use of dies without boosters or dies with boosters whose thermal transfer properties are not optimized, in particular being too insulating and unduly limiting the thermal gradient that determines the rate of cooling. Also, the prior art, e.g., Yotsutsuji (U.S. Pat. No. 4,285,901), which employs a metal coated thermal insulating liner over the surface of the mold cavity does not teach or recognize the advantage of maintaining a relatively low die temperature to accelerate cooling after the mold cavity is full. The manner in which the insulating layers of the prior art are used is to continue to employ relatively high die temperatures and increase the temperature of the cavity surface to above the solidifying temperature of the plastic being molded in an effort to improve the surface quality of the finished article. This lengthens the cooling cycle as compared to the quicker cooling cycle of the present invention.

The invention cools the cavity below the softening temperature when the cavity is "approximately" fill, which reflects certain differences between molding operations and between the manner in which a given molder may choose to operate. The object is to shorten the overall cycle time, but a given molder may be willing to have a relatively longer cycle time, for example to improve the quality of the part. Some molding operations employ a hold period during which pressure is maintained on the material. For example with injection molding, inlet pressure can be held on the material for a time as the molten material cools and shrinks, with additional molten material flowing into the cavity to compensate for the shrinkage. The invention is applicable if the mold cavity temperature remains above the molding temperature until slightly before all the material is in the cavity or slightly after, or similarly until after a required hold period has elapsed, in each case achieving advantages over known molding methods operated in a comparable manner.

The invention departs from lessons taught by Rubin, supra, and from the common wisdom of the molding industry, in using temperature boosting or insulating materials to reduce cooling time (the time from completion of filling to solidification), whereas insulating materials can normally be expected to extend cooling time. This is accomplished with booster materials having low thermal conductivity (i.e., low kρc products), but the boosters are not defined by thermal conductivity alone. It is possible to choose a material for an insulation layer that has a lower thermal conductivity than another material but to choose or configure it such that the chosen insulation material raises the temperature at the surface of the cavity less. This occurs when the density and/or specific heat is sufficiently greater and/or by limiting its thickness. Relatively greater density and/or specific heat require more heat energy to achieve a given temperature increase on the cavity surfaces due to the nature of the material. Given a temperature difference, relatively thinner booster material produces a steeper temperature gradient across the booster, which leads to increased heat conduction from the surface into the dies. These contrast with the effect of reduced thermal conductivity to slow heat flow through the insulation layer and cause higher temperatures at the cavity surfaces.

For example, Xydar G-430 brand liquid crystal polymer has a lower thermal conductivity than polyphenylene sulphide (2.9×10⁻⁶ versus 3.85×10⁶ BTU/sec-in-° F.). But Xydar G-430 causes a smaller temperature increase than polyphenylene sulphide. This is because Xydar G-430 has a higher product of thermal conductivity, density, and specific heat than polyphenylene sulphide (6.87×10⁻⁸ versus 5.56×10⁻⁸ BTU²/sec-in⁴-° F.²).

Because while the mold is filling, heat flowing from the molten material increases the temperature of the cavity surfaces so much more than with dies without temperature boosters, the initial temperature of die 18 can be lowered. For example, to bring cavity surfaces to 270° F. when contacted by 600° F. molten polycarbonate, the approximate predetermined temperature ($T_P$) of cavity surfaces just prior to contact by molten material is:

| Cavity Surface Material | Predetermined Temperature |
|---|---|
| Aluminum | 260° F. |
| H-13 tool steel | 248° F. |
| 420 stainless steel | 244° F. |
| sapphire booster | 191° F. |
| quartz booster | 134° F. |

The above values for predetermined temperature ($T_P$) where calculated from the equations $$T_P = \frac{T - aT_M}{1 - a} = \frac{270 - a(600)}{1 - a}$$

$$\text{where:} \quad a = \frac{\sqrt{(k\rho c)_M}}{\sqrt{(k\rho c)_M} + \sqrt{(k\rho c)_S}}$$

T is the temperature of the cavity surface required during mold filling to produce a molded article and is determined from manufacturers recommendations, analysis, experiment and/or concerns as to the surface quality; $T_M$ is the initial bulk (processing) temperature of the molten material as it enters the cavity and is determined in the same ways as temperature T; k is the thermal conductivity of a material; ρ is the density of the material; c is the specified heat of the material; and subscripts M and S distinguish the molten material and the cavity, surface material, respectively.

The above equations produce approximate temperatures and are subject to other variables such as convection, contact resistance, changes in thermal physical properties with temperature, and initial temperature gradients. Nonetheless, they show that the mathematical products of thermal conductivity, density, and specific heat (kρc) of primary boosters result in substantially lower predetermined cavity surface and die temperatures than when materials with higher corresponding kρc products such as common mold metals are used for cavity surfaces. Due to heat storage, the die temperature is lower than the predetermined cavity surface temperature. The amount it is lower depends on the design of the die and the molding cycle. The difference between the predetermined temperature and the die temperature is normally less when the temperature stimuli, such as coolant passages, are closer to the cavity surfaces and when the molding cycle is longer.

The thickness ($W_b$) of boosters 14 is calculated from the following equation, such that the booster is at least thick enough to hold the temperatures of cavity surfaces at or above temperatures required to produce a molded article until the cavity is approximately full. However, subject to variations discussed below, the booster is preferably kept as thin as practicable so as to provide good heat transfer from the molten material into the die. Thus, after the cavity is approximately full, heat flowing from the boosters to the cooler dies cools the cavity surfaces to minimize cooling time.

$$W_b = Y\sqrt{\frac{k_b t_f}{\rho_b c_b}} \quad 0.25 \leq Y \leq 4.0$$

where $t_f$ is the time to fill the mold, $k_b$ is the thermal conductivity, $\rho_b$ is the density, and $c_b$ is the specific heat of the booster;

The mold can have boosters that are different in material or thickness in order to achieve a similar result at different portions of the molded article, such as to accommodate thicker and thinner areas. For molding a thin article with a peripheral edge such as a polycarbonate disk, edge booster 20 can be disposed at the peripheral edge of the cavity to reduce heat flow from the edge as compared to areas spaced from the edge. For edge boosters, the mathematical product of thermal conductivity, density, and specific heat is no more than 2.0×10⁻⁶ BTU²/sec/in⁴/° F.² at room temperature and preferably the product is smaller than it is for boosters 14. The purpose of booster 20 is to cool the molded article more uniformly by reducing heat flow at its edges, which otherwise would cool more quickly than other portions.

Although not shown in FIG. 1, booster thicknesses can be different at different locations in other respects to promote more uniform cooling. Also, boosters may cover only part of the cavity surfaces. Generally, boosters preferably are thicker where the molded article is thinner (due to closer proximity of the material of the workpiece to the dies) and are thinner where the molded article is thicker. This can be used to determine the particular thickness of the boosters within the range stated above. In addition, manufacturing variations may dictate foregoing time savings possible by use of boosters that are as thin as possible in the range, in order to make the boosters and dies more durable or to extend the time that the cavity surfaces exceed the molding temperature to achieve a more precise imprint of the mold surface contours on the molded workpiece (for example to better replicate cavity surfaces).

The particular value for factor "Y" can be determined by finite element analysis, namely the modelling of temperature over time at particular points, after defining heat transfer characteristics of a system. An efficient way to select a specific value of factor "Y" is to employ a finite element model of one or more slices through the mold, extending from the temperature control stimuli on one side of the mold to the temperature control stimuli on the other side, the slice extending through the cavity and the workpiece to be molded. An example of the finite element modelling approach is provided under the description for FIG. 2. Specific design cases are described below.

When the thickness of the molded article is substantially uniform, the temperature control stimuli is substantially the same distance from the surface on both sides of the mold cavity, and the molded article is removed in a small fraction of the time the mold is open, the value of "Y" can be chosen at an intermediate point in the range, preferably between 1.0 and 3.0, namely at 1.0 if molding speed is an overriding concern and at 3.0 if surface condition is; more important than speed.

The thickness of the molded article may vary significantly, and if the factor "Y" is set at 1.0 in the range, the factor (i.e., the thickness of the primary booster) can be increased by a factor as large as four where the molded article is thinner, or decreased by a factor of 0.25 where the molded article is thicker. A range of 0.25 to 4.0 has been found to provide sufficient versatility to account for thickness variations and compromises between speed and surface quality and/or mold durability concerns, while retaining the advantage of providing surface temperature boosters but limiting them so that the surface temperature is above molding temperature only as long as is required. Otherwise, thermal transfer through the boosters is maximized to minimize molding time.

In a finite element analysis when the temperature control stimuli is not substantially the same distance from the surface on both sides of the mold cavity, or if the molded article is not removed in a small fraction of the time the mold is open, more heat will be stored in the side with more material between the cavity surface and temperature control stimuli or on the side where the molded article contacts the cavity surface for a substantially longer time period. This will cause the cavity surfaces of one side of the mold to heat and cool at a different rate than the cavity surfaces of the other side of the mold. Lowering the temperature of control stimuli at the side of greater heat storage relative to the other side can cause the cavity surfaces to heat and cool at substantially the same rate. However, it is an aspect of the invention that molding can be accomplished using low die temperatures. Further temperature reduction could cause problems (e.g., condensation could form and ruin the surface of the molded article). Also, if the precisely machined die parts differ too much in temperature, differential thermal expansion may cause the mold parts to bind. Therefore, it may be preferable to heat and cool cavity surfaces uniformly and adjust their temperatures by making the primary booster thinner on the side of greater heat storage, where values of "Y" between 0.25 and 2.0 would be typical.

The value of "Y" may have to be less than optimum (i.e., greater than the theoretical minimum) because current technology limits the minimum or maximum thickness of a desired booster material. Zirconia of adequate structural integrity can be plasma sprayed onto a metal surface until it is 0.010 to 0.035 inch thick. Many brittle materials such as sapphire and quartz that are very thin, such as .030 inch or less, may be difficult to handle, bond, braze or clamp without damage. Other materials such as Kapton brand polyimide film are only produced in a few thicknesses. It is sometimes appropriate to vary the value of "Y" in its range to accommodate these limiting conditions.

Depending upon the specific requirements for cavity surface characteristics such as smoothness, hardness, stiffness, scratch resistance, chip resistance, chemical resistance, etc., inorganic materials such as borosilicate glass, quartz, glass ceramic, titanium, and sapphire are examples of materials that can be used as surface temperature boosters. For less demanding applications such as edge boosters, materials such as polyimide, liquid crystal polymer, polyphenylene sulphide, and mica may also be suitable.

Mold makers can pre-shape boosters by machining, molding, grinding, etc., then attach them in place using bolts, bonds, brazing or clamps, etc. Alternatively, booster material can be attached in such manners and then shaped to form the mold cavity by machining, grinding, etc. Booster material can be applied directly in layers by means such as sputtering, spin coating, or Sol-Gel coating (Geltech, Alachua, Fla. and others).

In the embodiment shown, left-side die 18 provides structural support to boosters 14 and 20. Die 18 can be made from various materials. The chosen material should have high thermal conductivity, e.g., common mold metals, and must have thermal coefficient of expansion properties compatible with booster materials so that differences in expansion cannot damage boosters 14 and 20 during temperature cycling. Fluid passages 12 and 22 can be provided to carry heated or cooled heat transfer fluid through die 18. Other known thermal means for temperature control stimuli may be used.

FIG. 1 also shows a right-side element 36. Element 36 comprises right-side primary temperature boosters 24, and right-side die 28. Boosters 24 define at least a part of the surfaces of a mold cavity 10. Right-side primary temperature boosters 24 have the same purposes and requirements as left-side primary temperature boosters 14 and can be made of the same or different materials. They can be installed in any of the ways already described for boosters 14. A right-side die 28 supports boosters 24 in the same way left-side die 18 supports boosters 14 and has the same requirements. Fluid passages 12 and 22 are also located in right-side die 28. Other thermal means for temperature control stimuli may be used. An entrance 40 provides a way for the molten material to enter mold cavity 10. Other means for introducing molten material into the mold cavity may be used.

The invention is applicable to molding various articles but is particularly useful for molding optical discs such as audio compact discs and CD-ROMs. If mold 42 of FIG. 1 is used to make such an optical disc, one of boosters 14 or 24 contains the digital information to be transferred to the disc by molding using the cavity surface. The information can be added to the booster surface by etching or by other methods. Alternatively, the information can be provided in a very thin coating of another material such as quartz, titanium nitride, or nickel which is itself applied to the cavity surface of boosters 14 or 24. The coating must be sufficiently thick to carry audio disc pits, which are approximately 0.11 micron deep, but not so thick as to significantly influence thermal behavior of the temperature boosters. The thickness of the coating should be less than one micron.

The mold 42 of FIG. 1 is operated by the steps:

(a). Provide mold 42.

(b). Apply temperature control stimuli to dies 18 and 28. Preferably, circulate heat transfer fluid at approximately constant temperatures through fluid passages 12 and 22 located in dies 18 and 28 adjusting fluid temperatures so that after many molding cycles, temperatures cycle repeatably so that the surfaces of the cavity are at predetermined temperatures just prior to contact by the molten material to be introduced into the mold cavity. The predetermined cavity surface temperatures are the temperatures that will upon contact by the molten material., increase to the temperatures required while the mold is filling to produce a molded article. Because of the low $k\rho c$ product of the boosters, the predetermined temperatures are substantially lower than when cavity surfaces are formed by materials with higher $k\rho c$ products, such as when the same die is made of common mold metals and does not have any boosters. When molding thermoplastics, predetermined temperatures are also substantially lower than when the temperatures of cavity surfaces during mold filling are above the solidifying temperature of the thermoplastic, as is done in some of the prior art, e.g., Yotsutsuji, supra.

(c). Introduce molten material into cavity 10 through entrance 40 and into contact with cavity surfaces formed by boosters 14, 20 and 24 where the product of thermal conductivity, density, and specific heat of the boosters cause heat flowing from the molten material to increase cavity surface temperatures from the predetermined temperatures ($T_P$), which are significantly below the temperatures required during mold filling, to or above the required mold filling temperature. Representative temperature increases from the initial predetermined temperatures ($T_P$) to a mold filling temperature (T) of 270° F. when a cavity surface is contacted by polycarbonate at 600° F. are listed below:

| Cavity Surface Material | Temperature Increase |
| --- | --- |
| Aluminum | 10 F.° |
| H-13 tool steel | 22 F.° |
| 420 stainless steel | 26 F.° |
| sapphire booster | 79 F.° |
| quartz booster | 136 F.° |

This list shows that the temperature increases for cavity surfaces of the boosters of this invention are substantially greater than for cavity surfaces of dies made entirely from common mold metals. The large temperature increases caused by the boosters make it possible to bring cavity surfaces to the required temperatures during mold filling from the low predetermined cavity surface and die temperatures.

When this invention is used to mold a thermoplastic, the temperatures (T) of cavity surfaces required during mold filling are below the solidifying temperatures of the thermoplastic.

(d). While the cavity is filling with molten material, the cavity surfaces are held at or above the temperatures m required to produce a molded article by cooperatively using heal; flowing from the molten material to boosters 14, 20, and 24 and the combined effect of the thermal conductivities, specific heats, densities, and predetermined thicknesses of these boosters. The thicknesses of the boosters being selected to be enough to hold cavity surface temperatures at or above the temperatures required to produce a molded article until the mold cavity is approximately full yet optimally thin for the next step. The equation for selecting booster thicknesses was provided above.

(e). The thicknesses of boosters 14 and 24, having been selected in the preceding step, preferably to be as thin as practicable, optimize the thermal resistances and capacity of the boosters, which work in cooperation with the relatively cool die temperatures and decreasing heat flow from the molten material. Starting when the cavity is approximately full, heat flowing from the boosters to the cooler dies, reduces the temperature of the booster/cavity surfaces from or above the mold filling temperatures (T) towards the predetermined cavity surface temperatures ($T_P$). Because the predetermined cavity surface temperatures for this invention are substantially lower than they could be for dies made entirely of common mold metals, the cavity surfaces can be cooled more than they could be for common metal molds. In fact they should be cooled more, because otherwise the temperature increase caused by the molten material, which increase is large due to the boosters, would cause the cavity to be above the predetermined temperatures ($T_P$) when the mold is available for a next molding cycle. Waiting to cool further would lengthen the molding cycle unnecessarily.

Keeping the dies relatively cool, and also regulating the temperature such that the cavity surfaces are relatively cool after the mold is full, increases the rate of heat transfer from the molten material, because heat transfer is due in part to temperature gradient. Thus cooler temperatures for the mold tend to cool, stiffen, and solidify the workpiece faster. I have found that the time to cool material from the molten state into an article rigid enough for removal from a mold can be reduced at least twenty percent by the technique described herein.

In contrast to the present invention, U.S. Pat. Nos. 3,734,449, 4,285,901, 5,041,247, and 5,064,597, the experiment of Liou, supra, and my cross-referenced patent for molding thermoplastics, operate at much hotter die temperatures. When the mold is filling, the cavity surfaces exceed the solidifying temperature of the thermoplastic being molded. The increased temperatures of the cavity surfaces and dies reduce the rate of heat flow from the thermoplastic during and after mold filling, which increases the time to solidify the article. Liou reported approximately twenty percent increase in cooling time in contrast to at least a twenty percent decrease in cooling time afforded by the methods and apparatus of this invention.

DuPont, supra, and U.S. Pat. Nos. 4,340,551, 4,338,068 and 3,619,449 employ complicated and expensive equipment to add heat and remove heat. This causes the cavity surface temperature to cycle, that is to increase for mold filling and to decrease after the mold is fill. This technique is useful but complex. The present invention causes the desired cavity surface temperature cycling without first adding and then removing heat at the dies and without moving parts and complex controls.

I have found finite element transient heat transfer analysis is a suitable way to select materials, evaluate thicknesses for boosters 14, 20, and 24, and select temperatures for molten material and dies. One dimensional models are fast and adequate for preliminary evaluation and selection. Two or three dimensional models and molding experiments can be used for final selections. An example is provided in the description for FIG. 2.

Figure 2:
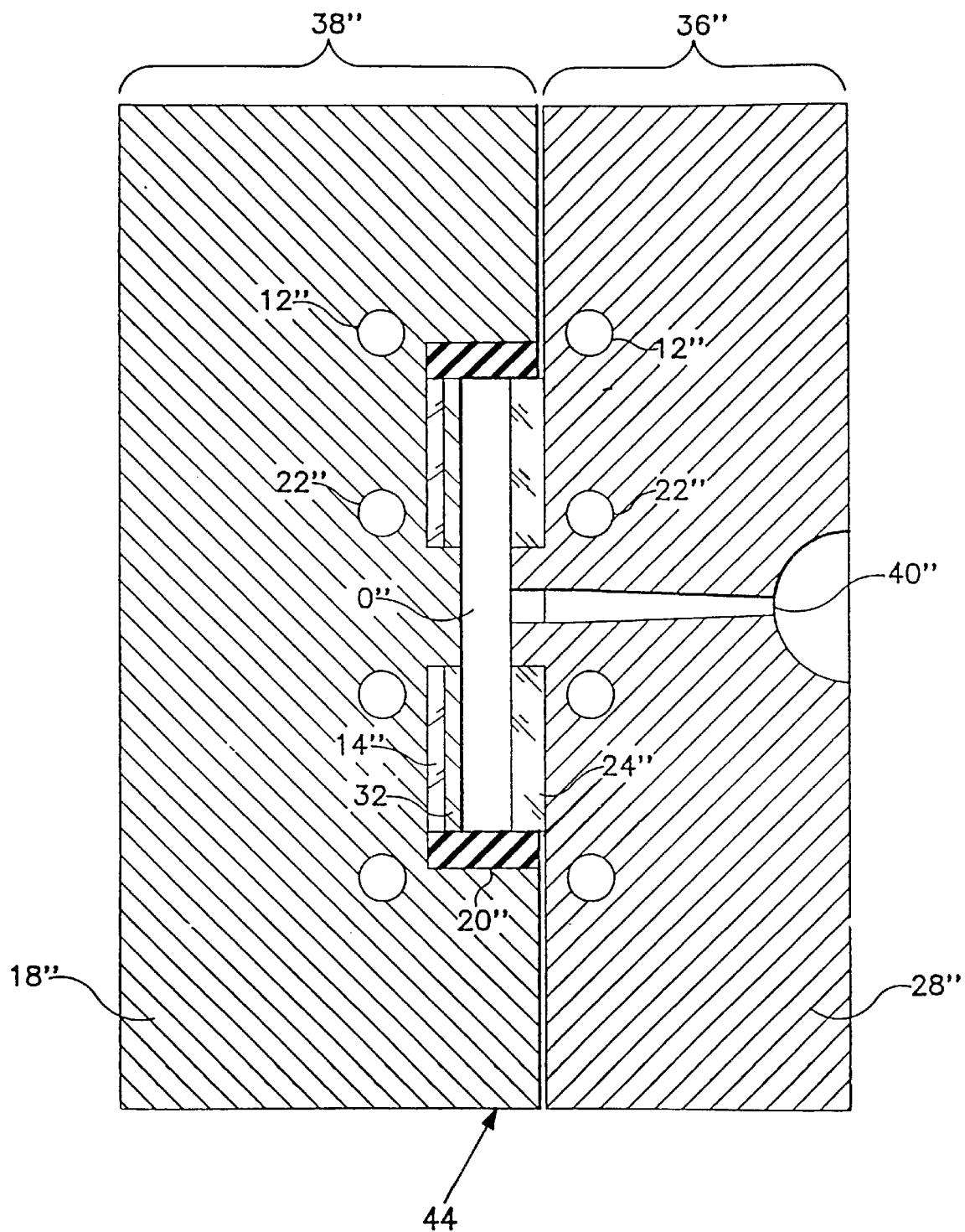
FIG. 2 is a cross-section of a mold according to a second embodiment of the invention.

FIG. 2 shows a simplified cross-section of mold 44, a second embodiment that is useful for molding optical discs. A left-side element 38" comprises stamper 32, left-side primary temperature boosters 14", edge temperature booster 20", and left-side die 18". Stamper 32 and edge booster 20" define at least a part of the surfaces of a cavity 10".

The purpose of stamper 32 is to provide a surface that contains the digital information that will be transferred to an optical disc when it is molded. The stamper is made of material that has the required durability at the temperatures and pressures at which it must operate, and whose mathematical product of thermal conductivity, density, and specific heat is greater than those of boosters 14". Suitable materials can be selected from the group consisting of metals, glasses, and ceramics. A thin nickel layer 0.010 to 0.013 inch thick is typically used for the stamper, but the thickness may be 0.005 to 0.025 inch. The stamper increases the demands on boosters 14", because the boosters must restrict heat flow from the stamper to cause some of the heat from the molten material to build up within the stamper to raise its temperature and thereby the cavity surface temperatures. More heat is required to raise the temperature of the stamper when the thickness, and the mathematical product of density and specific heat of the stamper are greater. I have also discovered that the greater the thickness, and product of density and specific heat of the stamper, the more time it takes to raise the cavity surface temperature from the predetermined temperature to the temperature required during mold filling. Although the time is short, it is significant compared to the substantially instantaneous increase in temperature provided by boosters, which may require higher predetermined temperatures, or a layer thermally similar to the stamper on the opposite cavity face, or boosters with lower kρc products on the stamper side to compensate. The performance penalties of the stamper are overcome by two of its benefits compared to boosters: (1) the technology for incorporating digital information into part of the cavity surface of a metal stamper is in common use, and (2) the large investment in stamper making equipment has already been made by stamper manufacturers.

In addition to the demands imposed on the booster described above, the purposes, requirements, and suitable materials for boosters 14" and 20" are the same as those for boosters 14 and 20 of FIG. 1, mold 42. Although not shown in FIG. 2, booster thicknesses can be different at different locations to promote more uniform cooling, and boosters can be located behind only part of the stamper. To more closely match the temperature history curve of the cavity surface on the opposite side, the thickness of the primary booster behind the stamper can be reduced. A value of "Y" between 0.25 and 1.0 is typical. Except for the stamper, the mold can be made using the same methods as used for mold 42 of FIG. 1.

Left-side die 18" provides structural support to stamper 32, and boosters 14" and 20". The purposes, and requirements for die 18" and fluid passages 12" and 22" are the same as those for die 18 and passages 12 and 22 of mold 42 of FIG. 1.

FIG. 2 also shows a right-side element 36". Element 36" comprises right-side primary temperature boosters 24", and right-side die 28". Boosters 24" can be made of the same or different materials as boosters 14", and have the same requirements. The boosters can be installed in any of the ways already described for left-side element 38". A right-side die 28" supports boosters 24" in the same way left-side die 18" supports boosters 14" and has the same requirements. Fluid passages 12" and 22" are also located in right-side die 28". Other thermal means for temperature control stimuli for the die may be used. An entrance 4011 provides a way for molten material to enter mold cavity 10". Although not shown in the figures, entrance 40 can be on the left side rather than the right side of the mold. Other means for bringing molten material into the mold cavity may be used.

A computerized finite element analysis was performed for Example 5, which simulates molding an optical disc using this embodiment of the invention. For transient thermal analysis the geometry, thermal conductivity, density, and specific heat of the materials are input. The boundary temperatures, initial temperature distribution, calculation time steps, and total heat transfer time must also be provided. Five models were used to properly simulate a molding cycle. The first (the cooling mode) depicts the mold closed from the time hot molten polycarbonate contacts the cavity surface until the mold is opened. The second depicts the mirror-side (the side opposite from the stamper) while the mold is open and the cavity surface is exposed to air. The third and fourth depict the stamper-side first with the disc still in contact, then with the disc removed and the stamper exposed to air. The final model (delay model) depicts the mold closed before the molten polycarbonate contacts the cavity surfaces. Room temperature was used as the initial temperature for the cooling model. The output temperatures from each model are used as the input temperatures for the appropriate model that follows. That is the output temperatures from the cooling model are the input temperatures for the mirror and stamper with disc models, the output from the stamper with disc is the input for the stamper exposed to air model, the output from the mirror and stamper exposed to air models are the input for the delay model, and the output from the delay model is the input for the cooling model for the next cycle. The cycle is repeated until the input and output temperatures are repeatable each cycle. This can be as little as two cycles or more than forty cycles depending upon the mold design and molded article. Thirty cycles were required for the final run of this set of models.

The cooling model is 0.02 inch wide by 3.078 inches long. It simulates a cut through the mold from heat transfer fluid passages on the mirror-side to heat transfer passages on the stamper-side. The distance from the heat transfer fluid passages to the stamper is 1.513 inches, the stamper is 1.010 inch thick, the polycarbonate optical disc is 0.048 inch thick, and the distance from the polycarbonate to the heat transfer fluid passages on the mirror-side is 1.510 inches. The temperatures of the heat transfer fluid are provided as specified constant temperatures at the appropriate locations in the model geometry. Substituting 0.5 seconds mold filling time and the thermal conductivity, density and specific heat for sapphire into the equation for the primary booster thickness, the calculated thickness for a sapphire booster is 0.026 where "Y" equals 1.0. Similarly the thickness calculated for a Kapton brand polyimide booster is 0.008. The actual thicknesses is determined by trial and error through several finite element model analysis runs. The distance from the fluid passages to the stamper was initially divided into 1.505 inches consisting of 12 elements of 420 stainless steel, and 0.008 inches consisting of eight elements of Kapton. The distance from the polycarbonate to the fluid passages on the mirror-side were divided into 0.080 inch consisting of 8 elements of sapphire, and 1.430 inches consisting of 6 elements of 420 stainless steel. The polycarbonate was modelled as 16 elements starting at 0.0005 inch thick at each cavity surface with each succeeding element thicker than the preceding one as they approach the center of the polycarbonate. The mirror model is made by deleting from the cooling model all elements from the stamper-side fluid passages through to the first sapphire element, which forms the cavity surface of the mirror-side. The cavity surface is identified as a convection boundary and the temperature and corresponding heat transfer coefficients, which are calculated from formulas in standard textbooks, are applied at these surfaces. A similar approach is used for the remaining models. That is, delete all elements that do not depict the desired model and add boundary conditions. This is a common technique for developing a new model from an existing model when applying the widely used finite element analysis method.

The initial time step for the transient heat flow analysis was 1.5E -6 second with the time steps increasing in magnitude each calculation step to a maximum of 0.25 seconds. The extremely small initial time step was chosen to ensure mathematical stability since the first polycarbonate element is only 0.0005 inch thick. It may be possible to use a first time step as much as 60 times larger. Trial computer runs were made adjusting the fluid temperatures and booster thicknesses until the cavity surfaces were above the temperatures required to mold an optical disc until the cavity was approximately full. The final booster thicknesses were .002 inch Kapton (Y=0.250) and 0.040 inch sapphire (Y=1.5).

The mold 44 of FIG. 2 is operated by the steps:

(a). Provide mold 44.

(b). This step is the same as step (b) for operation of mold 42 of FIG. 1.

(c). The right side of this mold operates in the same way as step (c) for the operation of mold 42 of FIG. 1. For the left side, molten material being introduced into cavity 10"

through entrance 40" comes into contact with stamper 32 where heat flowing from the molten material to said stamper causes temperatures of cavity surfaces formed by the stamper to increase. Cavity surfaces reach temperatures determined by the products of thermal conductivity, density and specific heat of the molten material, and of the materials used for the stampers, and by the temperatures of each just before they contact. For example, if a nickel stamper initially at 165-F is contacted by 600° F. molten polycarbonate the temperature at the cavity surface increases about 15° F. to 180° F. The cavity surfaces remain at these temperatures as though boosters 14" do not exist until heat starts flowing through the stamper into the boosters. Higher thermal diffussivities, and less thicknesses of stamper 32, reduce the time until heat flows through the stamper into the boosters. The thermal diffussivity of a material is the thermal conductivity of the material divided by its density and specific heat. When heat starts flowing into boosters 14" the thermal conductivities, densities, and specific heats of the booster kρc product) act cooperatively to restrict the heat flow from the adjacent stamper 32. This causes the heat flowing from the molten material to build up within stamper 32 such that temperatures of cavity surfaces of the stamper increase to or above the temperatures (T) required during mold filling to produce a molded article. When molding a thermoplastic into an optical disc, the temperatures (1) of cavity surfaces required during mold filling are below the solidifying temperature of the thermoplastic. Polycarbonate is the current material of choice of most, if not all, optical disc manufacturers.

Steps (d) and (e) are the same as steps (d) and (e) for the operation of mold 42 of FIG. 1.

Figure 2A:
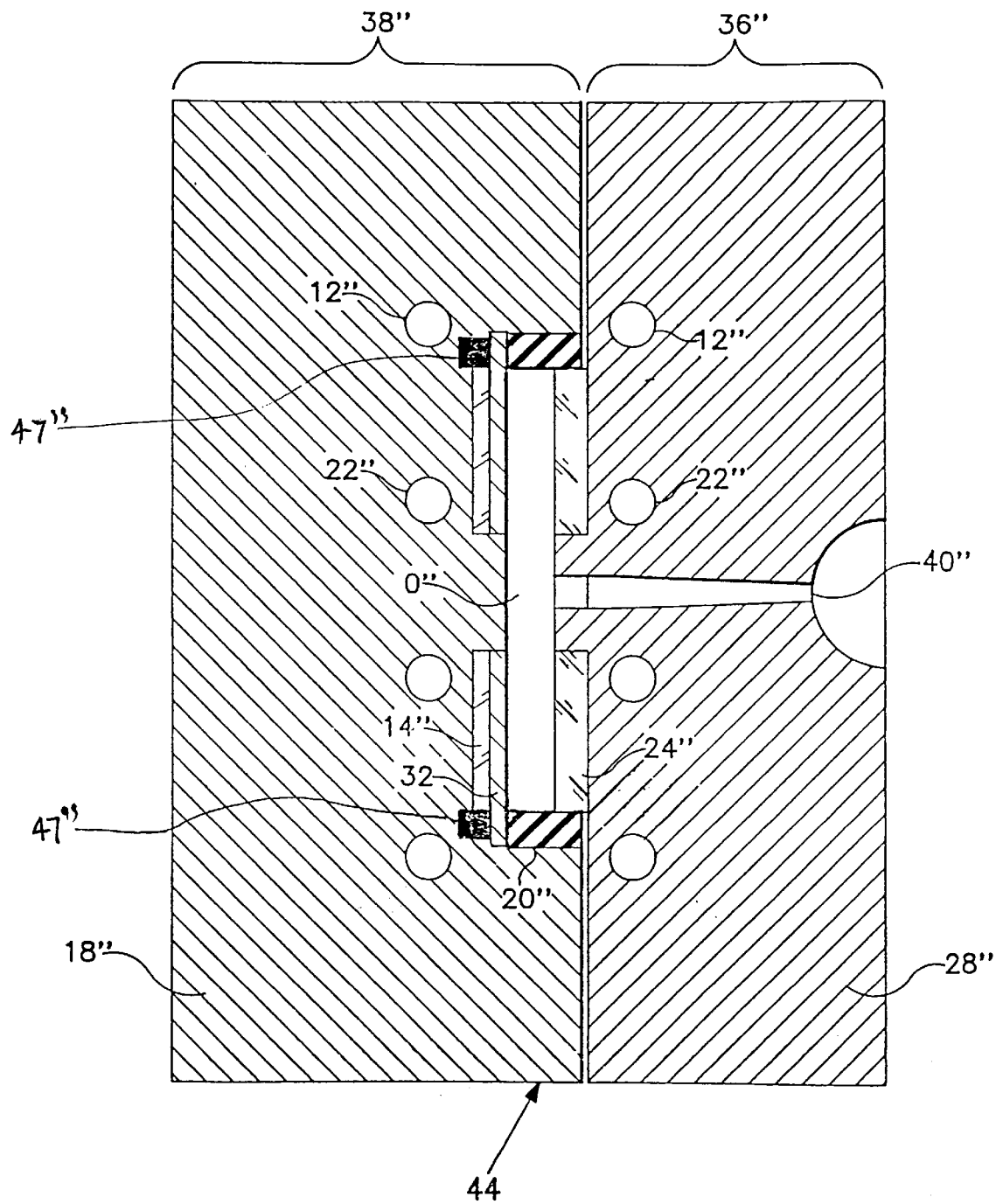
FIG. 2A is a cross-section of a mold according to a second embodiment of the invention, showing stamper heating means.

FIG. 2A shows a simplified cross-section of mold 44, a second embodiment that is useful for molding optical discs. Stamper heating means 47 are also shown in FIG. 2A. The stamper 32 may extend beyond the primary temperature boosters 14" as shown in FIG. 2A. It may also contact high thermal conductivity materials at or beyond the outside diameter of the mold cavity. When it does, it creates a path for heat to flow from and cool the outer edge of the optical disc excessively. Transfer of the pits from the stamper is more difficult in the cooler material at the outer edge of the disc reducing pit quality, which is detrimental to optical performance. Stresses are also created at the outer edge of the disc which cause birefringence that is also detrimental to optical performance. The stamper heating means 47 overcomes this problem. The heating means located in the mold die and in the vicinity adjacent to the periphery of the primary temperature booster, and in thermal contact with the stamper, increases the temperature of the stamper at the area of contact enough to reduce, stop, or even reverse the direction of heat flow. Alternatively, the stamper heating means may be located in the mold die of an optical disc mold in a vicinity of an outer diameter of the cavity and in thermal communication with the stamper. Thermal contact between the heater and the stamper may be accomplished directly or through an intermediary material of high thermal conductivity. Preferably, the heating means should have some thermal insulation from the die. The stamper heating means could also be of the electrical resistive heating type. By utilizing the stamper heating means, the birefringence at the outer edge of the optical disc is thus brought into acceptable limits.

An axisymmetric finite element model of an optical disc mold with a 4.2 mm×2.2 mm cross section heater was made. The 2.2 mm surface of the heater contacted the stamper. The heater was bonded in place with adhesive that thermally insulated it from the die. The hold and cooling portion of the molding cycle was 2.0 seconds for the mold of the invention. With the heater off, the temperature of the surface of the disc reached 201° F. at 40 mm radius and 182° F. at 59 mm radius by the end of the hold period. When the mold opened the temperatures had cooled to 166° F. at 40 mm radius and 152° F. at 59 mm radius. With 190 watts applied to the model of the heater in the form of energy/(time-unit volume), the temperature of the surface of the disc reached 205° F. at 40 mm radius and 203° F. at 59 mm radius by the end of the hold period. When the mold opened the temperatures were 169° F. at 40 mm radius and 176° F. at 59 mm radius. The temperature of the heater ranged between 167° F. and 195° F. during the cooling period of the molding cycle and was higher when the stamper temperature was higher. The mold without temperature boosters or stamper heaters running at 3.1 seconds for hold and cooling is known to produce acceptable compact discs. Using it, the surface of the disc reaches 198° F. at 40 mm radius and 186° F. at 59 mm radius by the end of the hold period. When this mold opens the temperatures had cooled to 177° F. at 40 mm radius and 166° F. at 59 mm radius. The heater successfully caused the maximum temperature of the disc surface to be very uniform from 40 mm to 59 mm radii at temperatures high enough to produce acceptable discs. In fact, the maximum temperature at 59 mm is 17° F. higher than achieved by the mold without temperature boosters or stamper heaters, which improves pit replication in this area.

An experiment was performed using a rectangular cross section 350 watt eletrical heater, commonly known as a cable heater, for the stamper heating means. The cable heater was bonded to the die 18" with adhesive that also thermally insulated it from the die 18". It was installed and machined so that one face of the heater was flush with the primary booster 14". When the stamper was installed it contacted the heater directly. For the purpose of the experiment, a temperature controller was used to adjust the power to and the temperature of the heater. During the experiments, the mold was operated at various cooling times, and with various mold coolant temperatures. In every case, the birefringence at the outer edge of the disc was reduced to acceptable limits by adjusting the heater temperature. Pit quality throughout the data area of the disc was excellent. Without the heater the birefringence exceeded acceptable limits.

For example, for 2.3 seconds hold and cooling, 75° F. stamper die coolant, 70° F. opposing die coolant, and 175° F. heater temperature, the birefringence and skew (flatness) in the discs was unacceptably high at 59 mm radius. When the stamper heater temperature was increased to 190° F., the molded discs met all quality requirements. Another example, for 2.5 seconds hold and cooling, 80° F. stamper die coolant, 70° F. opposing die coolant, and 190° F. heater temperature, the birefringence and skew in the discs were unacceptably high at 59 mm radius. When the stamper heater temperature was increased to 200° F., the molded discs met all quality requirements.

To ensure excellent pit quality at the outer edge of the data area a molder may choose to bring the maximum temperature at 59 mm radius above the temperature midway through the data area (40 mm radius) by increasing the temperature of the stamper heater. This would reverse the heat flow through the heater towards the cavity.

By using a temperature controller the temperature of the heater is quickly and easily adjusted to control the quality of the outer edge of optical discs. The temperature and power requirements are easily determined by finite element analysis or testing. A 350 watt 4.4 mm×2.2 mm cable heater operating in the range of 175° F. to 230° F. will cover most of the compact audio disc molding conditions for a mold using temperature boosters of this invention. The preferred starting temperature is 190° F. The stamper heater can also be used to make the maximum temperatures of a disc being molded with an existing mold more uniform. The same heater could be used, and the heater temperature can easily be determined by finite element analysis or testing.

Figure 3:
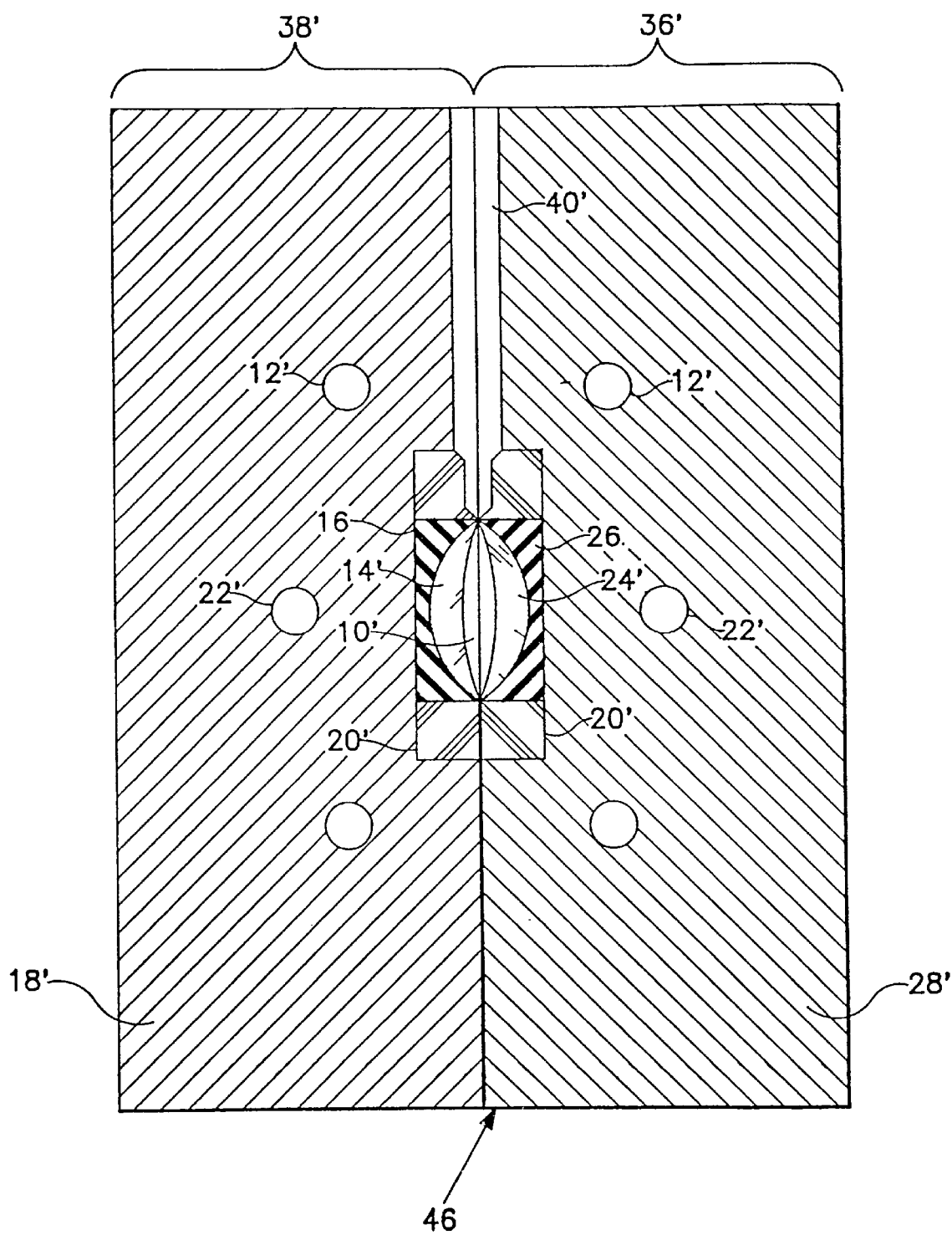
FIG. 3 is a cross-section of a mold according to a third embodiment of the invention.

FIG. 3 shows a simplified cross-section of mold 46, a third embodiment that is useful for molding an article. A left-side element 38' comprises left-side temperature boosters 14', left-side secondary temperature booster 16, edge temperature booster 20', and left-side die 18'. Boosters 14' and 20' define at least a part of the surfaces of cavity 10'. Boosters 14' are made of materials that have the required durability at the temperatures and pressures at which they operate and whose mathematical products (kρc) of thermal conductivity (k), density (ρ), and specific heat (c) are no more than $2.0 \times 10^{-6}$ $BTU^2/sec/in^4/°F.^2$ and preferably no more than $1.6 \times 10^{-6}$ $BTU^2/sec/in^4/°F.^2$ at room temperature. For booster 16, the kρc product must be smaller than it is for boosters 14'. Edge booster 20' has the same requirements as edge booster 20 of mold 42 of FIG. 1. Primary booster materials identified under the description for mold 42 of FIG. 1 can be used for boosters 14', 16 and 20'. In addition, polyimide, liquid crystal polymer, and mica are examples of other materials that can be used to make boosters 16 and 20'. Primary boosters 14' can be bonded to dies 18" using an adhesive such as acrylic, epoxy, or silicone that also functions as a secondary booster 16. Secondary booster 16 is needed when the materials used for primary boosters are selected for their desirable characteristics such as those listed above, but their temperatures do not increase sufficiently when contacted by the molten material such that predetermined cavity surface and die temperatures are low enough to accelerate cooling the amount desired. The secondary boosters restrict heat flow from adjacent primary boosters causing heat flowing from the molten material to build up within the primary booster such that temperatures of their cavity surfaces increase to or above that required during mold filling. Boosters 14' are shown thinner towards the cavity edges and booster 16 is shown thicker towards the cavity edges to illustrate a design suitable for molding a double convex lens. For articles other than double convex lenses, the thicknesses may be uniform or thinned or thickened at various locations to tailor heat flow for the specific molded article. The thicknesses ($W_{sb}$) of secondary boosters fall within a range as calculated from the equation $$W_{sb} = Z\sqrt{\frac{k_{sb}t_f}{\rho_{sb}c_{sb}}} \quad 0.025 \leq Z \leq 4.0$$

where $t_f$ is the time to fill the mold, $k_{sb}$ is the thermal conductivity, $\rho_{sb}$ is the density, and $c_{sb}$ is the specific heat of the secondary booster.

When the thickness of the molded article is substantially uniform, the temperature control stimuli is substantially the same distance from the surface on both sides of the mold cavity, and the molded article is removed in a small fraction of the time the mold is open, value of "Z" should be between 0.1 and 0.5. The primary booster should be as thin as possible to allow secondary booster effects to be felt as early as possible. A value of "Y" between 0.25 and 1 is desirable.

When the thickness of the molded article varies significantly, The thickness of the secondary booster should be increased where the molded article is thinner and decreased where the molded article is thicker. A value of "Z" as low 0.025 may be necessary where the molded article is thickest and as high as 4.0 where the molded article is thinnest. Generally, the thickness of the primary booster should be decreased where the molded article is thinner. A value of "Y" as low 0.25 may be necessary where the molded article is thinner.

When the secondary booster is made of adhesive, availability and processing characteristics may lead to less than optimum adhesive thickness. For example, economics and available equipment may dictate that a transfer film adhesive be used to ensure more uniform adhesive (secondary booster) thickness, but the adhesive is only available in thicknesses different from the desired thickness. A value of "Z" between 0.025 and 2.0 may be selected. Specific values of "Z" in the stated ranges can be varied for the same reasons discussed above with respect to "Y" and finite element temperature analysis modeling can be used as described.

Left-side die 18' provides structural support to boosters 14', 16 and 201. The purposes, and requirements for die 18' and fluid passages 12' and 22' are the same as those for die 18 and passages 12 and 22 of mold 42 of FIG. 1.

FIG. 3 also shows a right-side element 36'. Element 36' comprises right-side primary temperature boosters 24', right-side secondary temperature booster 26, and right-side die 28'. Boosters 20', and 24' define at least a part of the surfaces of a mold cavity 10'. Boosters 24' and 26 can be made of the same or different materials as boosters 14' and 16, respectively. They also have the same purposes and requirements as boosters 14' and 16. A right-side die 28' supports boosters 20', 24' and 26 in the same way left-side die 18' supports boosters 14' and 16 and has the same requirements. Fluid passages 12', and 22' are also located in right-side die 28. Other thermal means for temperature control stimuli for the dies may be used. An entrance 40' provides a means for the molten material to enter mold cavity 10'. Other means for bringing molten material into the mold cavity may be used. The mold can be made using the same methods used for mold 42 of FIG. 1.

Although not shown in FIG. 2 or FIG. 3, stamper 32 can be used with molds that have both primary and secondary boosters.

The mold 46 of FIG. 3 is operated by the steps:

(a). Provide a mold 46.

(b). This step is the same as step (b) for the operation of mold 42 of FIG. 1.

(c). Introduce molten material into cavity 10' through entrance 40' and into contact with cavity surfaces formed by temperature boosters 14', 20', and 24' where the mathematic products of thermal conductivity, density, and specific heat of these boosters cause heat flowing from the molten material to these boosters to increase temperatures of cavity surfaces. Cavity surfaces reach temperatures determined by the mathematical product of thermal conductivity, density, and specific heat of the molten material, and of the materials used for these boosters, and by the temperatures of each just before they contact. The cavity surfaces remains at these temperatures as though secondary boosters 16 and 26 do not exist until heat starts flowing through the primary boosters into the secondary boosters. The thinner boosters 14' and 24' are, and the higher their thermal diffissivities, the sooner heat starts flowing into the secondary boosters 16 and 26. When heat starts flowing into secondary boosters 16 and 26, the thermal conductivity, density, and specific heat of these boosters act cooperatively to restrict the heat flow from the adjacent boosters 14' or 24'. This causes heat flowing from the molten material to build up within primary boosters 14' and 24', thereby further increasing temperatures of cavity surfaces to or above the temperatures required during mold filling to produce a molded article. When molding a thermoplastic, the temperatures (T) of cavity surfaces required during mold filling are below the solidifying temperatures of the thermoplastic. By thinning primary boosters 14' and 24', and thickening secondary boosters 16 and 26 as they approach edges of cavity 10' as shown in FIG. 3, heat flow decreases towards the edges of the molded article where the heat flow is normally greatest. Boosters 14', 16, 24', and 26 can be thinned or thickened as necessary to tailor heat flow for a specific molded article.

(d). While the cavity is filling with molten material, hold the cavity surfaces at or above the temperatures (T) required to produce a molded article by cooperatively using heat flowing from the molten material to boosters 14', 16, 20', 24', and 26' and the mathematical product of the thermal conductivity, specific heat, and density, and the predetermined thicknesses of each of these boosters.

(e). This step is the same as step (e) for the operation of mold 42 of FIG. 1.

Transient heat transfer analysis using finite element techniques is a suitable way to select the materials and determine the final thicknesses of boosters 14', 16, 24', and 26, particularly using available computer programs. Depending on the geometry, one or two dimensional models are adequate for material selection and evaluating preliminary sizing. Three dimensional models or molding experiments may be appropriate for final design.

EXAMPLES

Using NISA II, I performed transient thermal analyses of all-metal molds and molds and methods according to this invention. NISA II is a commercially available family of finite element analysis software programs. The computer models are one dimensional.

The examples illustrate the advantages of the invention. They show where 155° F. dies are normally required, 105° F. dies can now be used. Where cooling normally takes 34 seconds, it can now be done in 25.5 seconds. The methods and apparatus of this invention, although they employ thermally insulating surface temperature boosters that could be expected to extend cooling time, are nevertheless shown to be effective to cool mold surfaces after the cavity is full, significantly faster than comparable methods using uninsulated (e.g., common metal) dies. Consequently, at least the surface skin of the molded article is cooler and more rigid at the time the article is ejected from the mold than it would be if a common metal mold were used.

In many cases, a molded article is rigid enough to be removed from the mold before the center of the molded article is solid. In every case it will be more rigid than an article molded in a common metal mold and can be removed sooner. If the article can be removed when the center material is not yet solid, the molds and methods of the invention will reduce cooling time more than indicated by the finite element examples, which show reductions of cooling time of at least twenty five percent.

EXAMPLE 1

Thermal analysis of a mold 42 according to FIG. 1 was compared with that for an all-metal mold. The molded article is 0.105" thick polystyrene. The temperature boosters 14 and 24 are 0.040" thick sapphire. The dies 18 and 28 are 420 stainless steel. The all-metal molds are also 420 stainless steel. At least thirty mold cycles were simulated for each mold. The time assumed to open the mold, remove the molded article and close the mold was 4 seconds.

For the all-metal mold, the heat transfer fluid temperature applied to the die was kept at 155° F. The predetermined cavity surface temperature was 179° F. and was repeatable within thirty cycles. The cavity surface temperature increased to 198° F. upon contact by 450° F. polystyrene, which also was repeatable. The center of the polystyrene cooled to the solidifying temperature of 212° F. in 34 seconds.

Figure 4A:
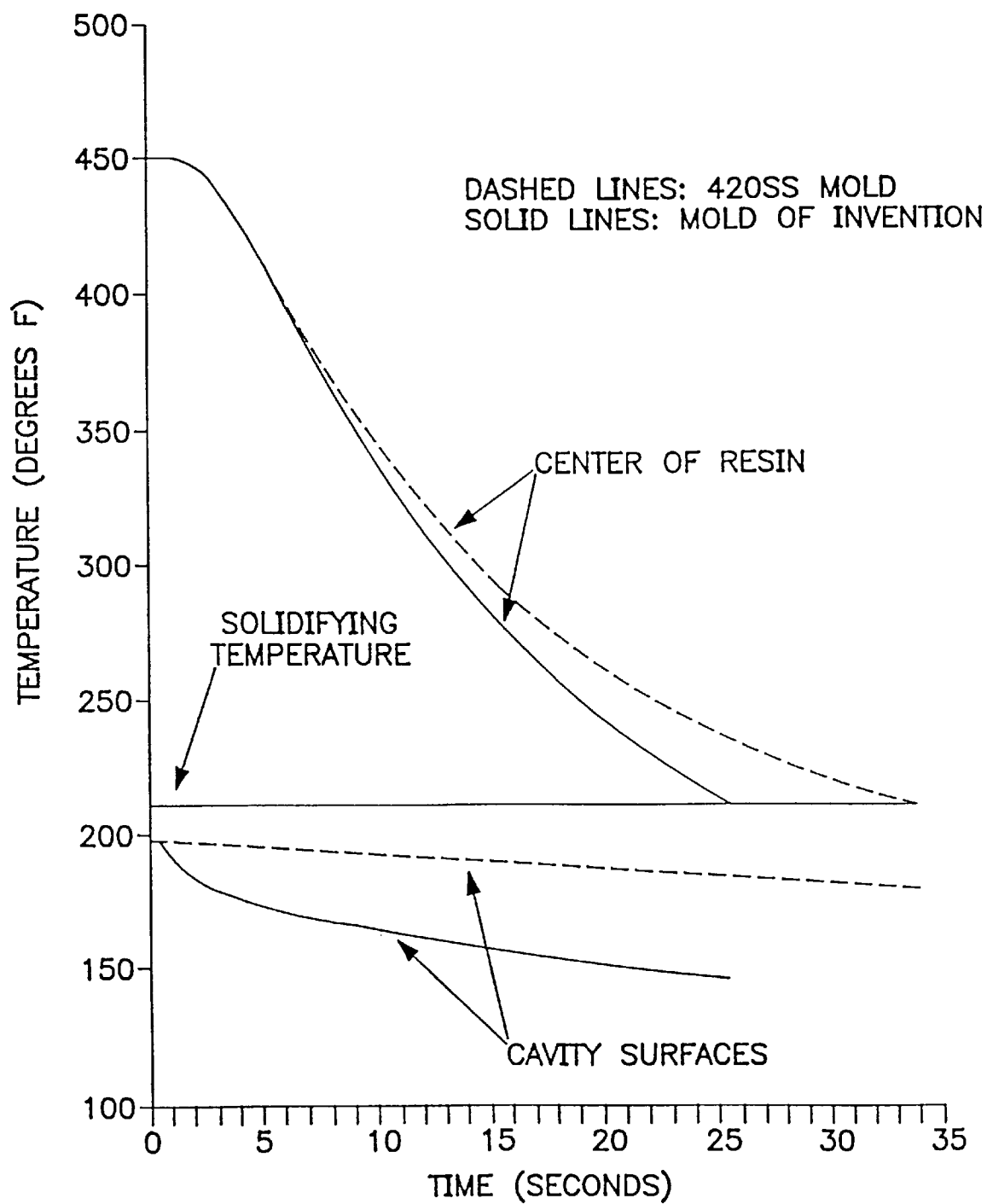
FIG. 4A shows temperature histories for Example 1, which uses the mold of FIG. 1.

For mold 42 of FIG. 1, the heat transfer fluid temperature at the die was kept at 103° F. left-side and 105° F. right-side. The predetermined cavity surface temperature was repeatable at 139° F. for both sides after thirty cycles. The cavity surface temperatures repeatedly increased to 198° F. upon resin contact. The $_{198}$° F. temperature was held for about 0.5 seconds, which is the time assumed to fill the mold. The center of the polystyrene cooled to the solidifying temperature of 212° F. in 25.5 seconds. The invention reduced the cooling time 25 percent as compared to the all-metal mold control example. FIG. 4A shows the temperature histories for the center of the resin and the cavity surface for both molds.

EXAMPLE 2

Figure 4B:
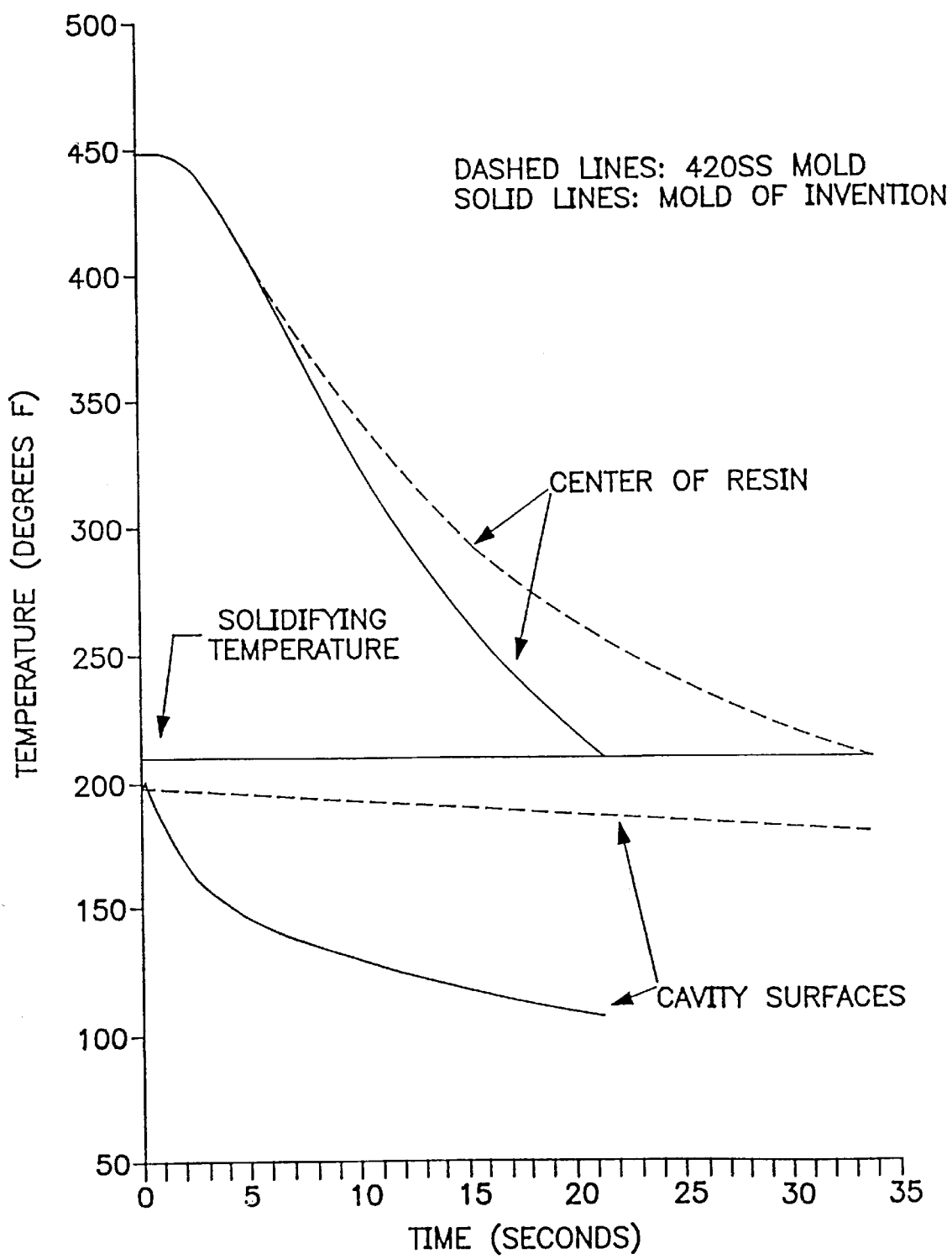
FIG. 4B shows temperature histories for Example 2, which uses the mold of FIG. 1.

The thermal analysis of Example 1 was repeated using 0.033 inch thick borosilicate glass temperature boosters. The temperature of the heat transfer fluid at the die was held at 40° F. left-side and 42° F. right-side. After thirty cycles, the predetermined cavity surface temperature became repeatable at 86° F. left-side and 87° F. right-side. Upon contact by 450° F. polystyrene, the surface temperatures increased repeatedly to 200° F. The cavity surface temperatures remained above 198° F. about 0.5 seconds, which is the time assumed to fill the mold. The center of the polystyrene decreased to the solidifying temperature of 212° F. in 21 seconds. The invention shortened the cooling time 38 percent compared to the all-metal mold of Example 1. FIG. 4B shows the temperature histories for the center of the resin and for the cavity surface for the invention and for the all-metal mold.

EXAMPLE 3

Another thermal analysis was performed for mold 42, this time for a 0.048" thick polycarbonate molded article. The temperatures of the heat transfer fluid for the all-metal dies were 170° F. left-side and 175° F. right-side. After over 30 cycles, the predetermined cavity temperatures were repeatable at 262° F. left-side and 265° F. right-side. Upon contact by 620° F. polycarbonate, the left-side temperature increased to 294° F. and the right-side temperature to 297° F., which were repeatable. The cavity surfaces were above 294° F. at 0.25 seconds, which is the time assumed to fill the cavity. The center of the resin cooled to 295° F. in 5 seconds, which is 10° F. below the solidifying temperature of this polycarbonate. The time to open the mold, remove the article, and close the mold was 3.75 seconds.

For the invention, the boosters were changed to 0.030" thick sapphire. The temperatures of the heat transfer fluid applied to the dies were 65° F. left-side and 1 10° F. right-side. After 30 cycles, the predetermined cavity temperatures were repeatable at 206° F. left-side and 203° F. right-side. Upon resin contact, the left-side increased to 302° F. and the right-side to 299° F. and was repeatable. The cavity surfaces were above 298° F. at 0.25 seconds, which is time assumed to fill the cavity. The center of the resin cooled to 295° F. in 3.25 seconds. The cooling time was reduced 35 percent.

Figure 4C:
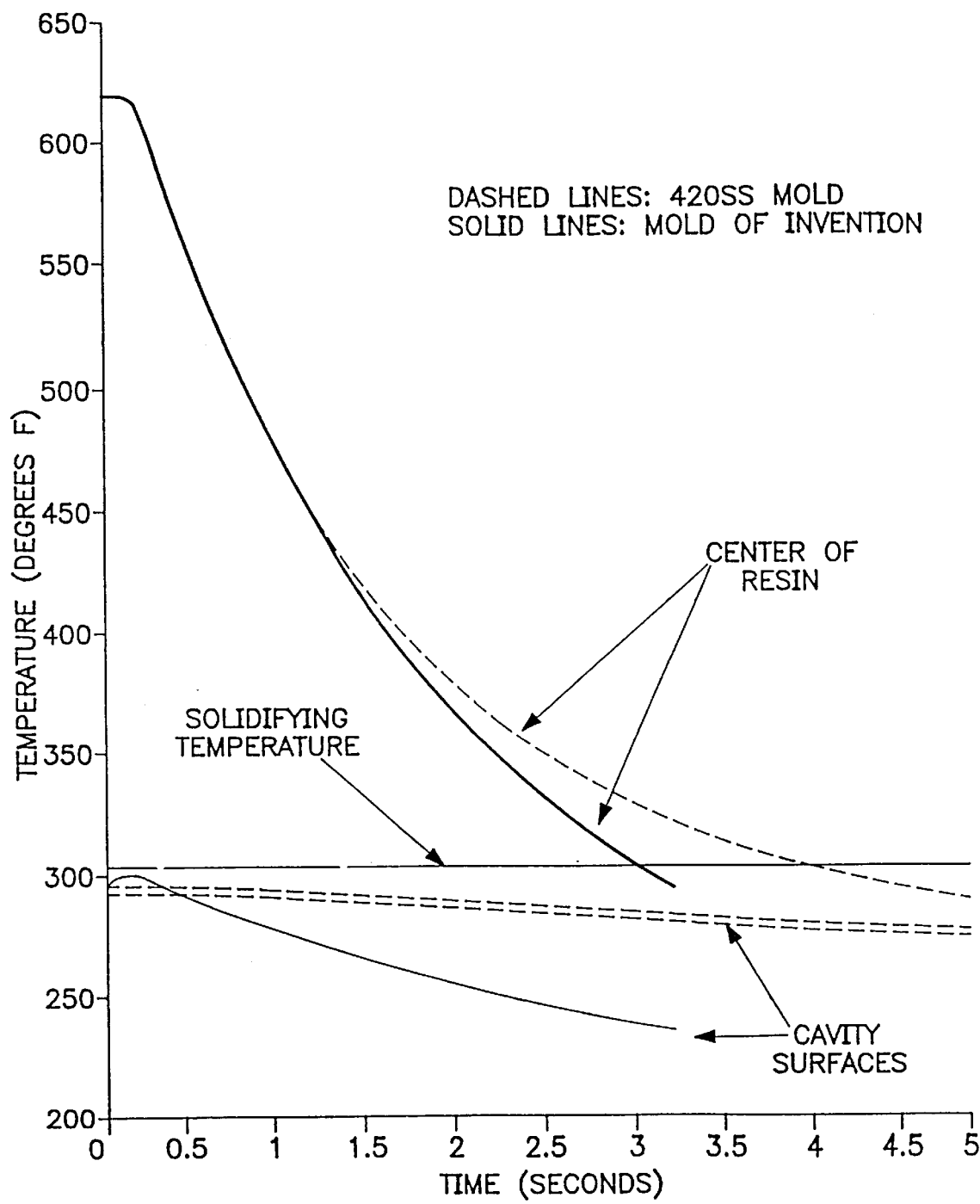
FIG. 4C shows temperature histories for Example 3, which uses the mold of FIG. 1.

Temperature histories for the center of the resin and the cavity surfaces for both molds are shown in FIG. 4C.

EXAMPLE 4

A thermal analysis of mold 42 was also done for a 0.105" polycarbonate article. The temperature of the heat transfer fluid for the all-metal dies was 205° F. for both left-side and right-sides. After 30 cycles, the predetermined cavity temperatures were repeatable at 258° F. left-side and 257° F. right-side. Upon contact by 620° F. polycarbonate, the left-side increased to 290° F. and the right-side to 289° F., which was repeatable. The cavity surface was slightly under 289° F. at 0.5 seconds, which is the chosen time for the cavity to fill. The center of the resin cooled to 295° F. in 18 seconds.

Boosters made of 0.035" sapphire were chosen according to the invention. The polycarbonate temperature was reduced from 620° F. to 580° F. The temperatures of the heat transfer fluid applied to the dies were 152° F. left-side and 158° F. right-side. After more than A 30 cycles, the predetermined cavity temperatures were repeatable at 203° F. left-side and 202° F. right-side. Upon resin contact, both the left-side and right-sides increased to 290° F. The cavity surfaces were above 286° F. at 0.5 seconds. The center of the resin cooled to 295° F. in 13.5 seconds. The cooling time was reduced 25 percent as compared to the all-metal mold control example.

Figure 4D:
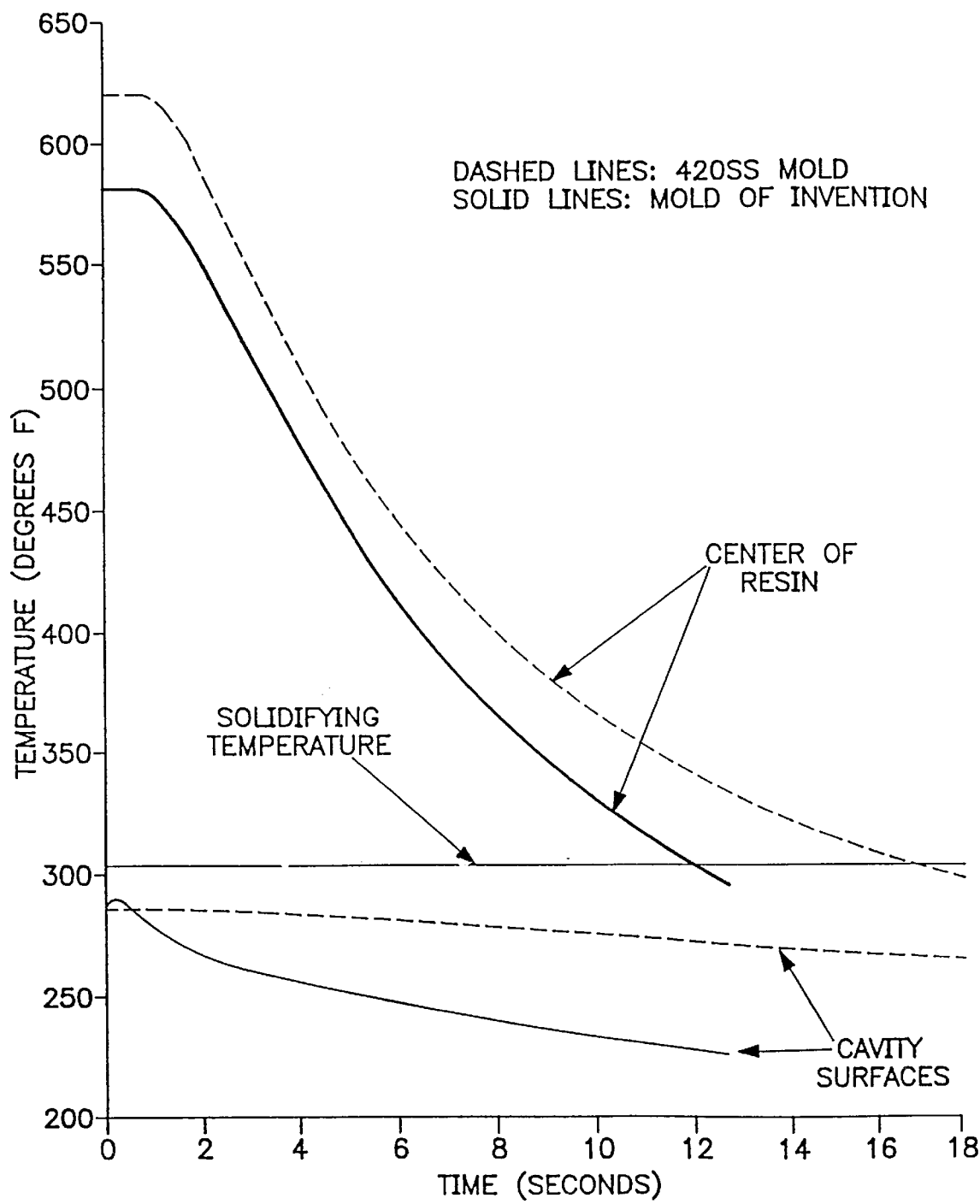
FIG. 4D shows temperature histories for Example 4, which uses the mold of FIG. 1.

FIG. 4D shows the temperature histories for the center of the resin and the cavity surfaces for both molds.

EXAMPLE 5

This example simulates molding a 0.048 inch thick polycarbonate optical disc in mold 44 of FIG. 2. Item 32 is a 0.010 inch thick nickel stamper that has digital information in the cavity surface for transfer to the optical disc. The optical disc can be a compact audio disc or a CD-ROM, for example. Boosters 14" and 24" are 0.002 inch thick Kapton brand polyimide film, and 0.04 inch thick sapphire respectively. The time to open the mold, remove the disc, and close the mold is 3.75 seconds.

The all-metal mold has a 0.010 inch thick nickel stamper on the left-side. It carries digital information for transfer to the optical disc. The heat transfer fluid at the die on the stamper side is held at 165° F. The heat transfer fluid is held at 170° F. for the right-side. After over 30 cycles, the predetermined temperatures are repeatable at 253° F. on the left-side and 254° F. on the right-side. Upon contact by 620° F. polycarbonate, the temperatures increase to 282° F. on the left-side and 285° F. on the right-side at 0.5 seconds when mold filling has just completed. This also is repeatable. The center of the resin cools from 620° F. to 273° F. in 5 seconds.

For the mold of the invention, the heat transfer fluid is held at 65° F. on the left-side and 75° F. on the right-side. After over 30 cycles, the predetermined temperatures are repeatable at 189° F. on the left-side and 188° F. on the right-side. Upon contact by 620° F. polycarbonate, temperatures increase to 286° F. and 285° F. on the left and right side respectively. At 0.5 seconds, when mold filling has just completed, they are at 285° F. and 284° F. at the left and right sides. The center of the resin cools to 273° F. in 3.25 seconds. In this example the invention reduced the cooling time 35 percent.

Figure 5:
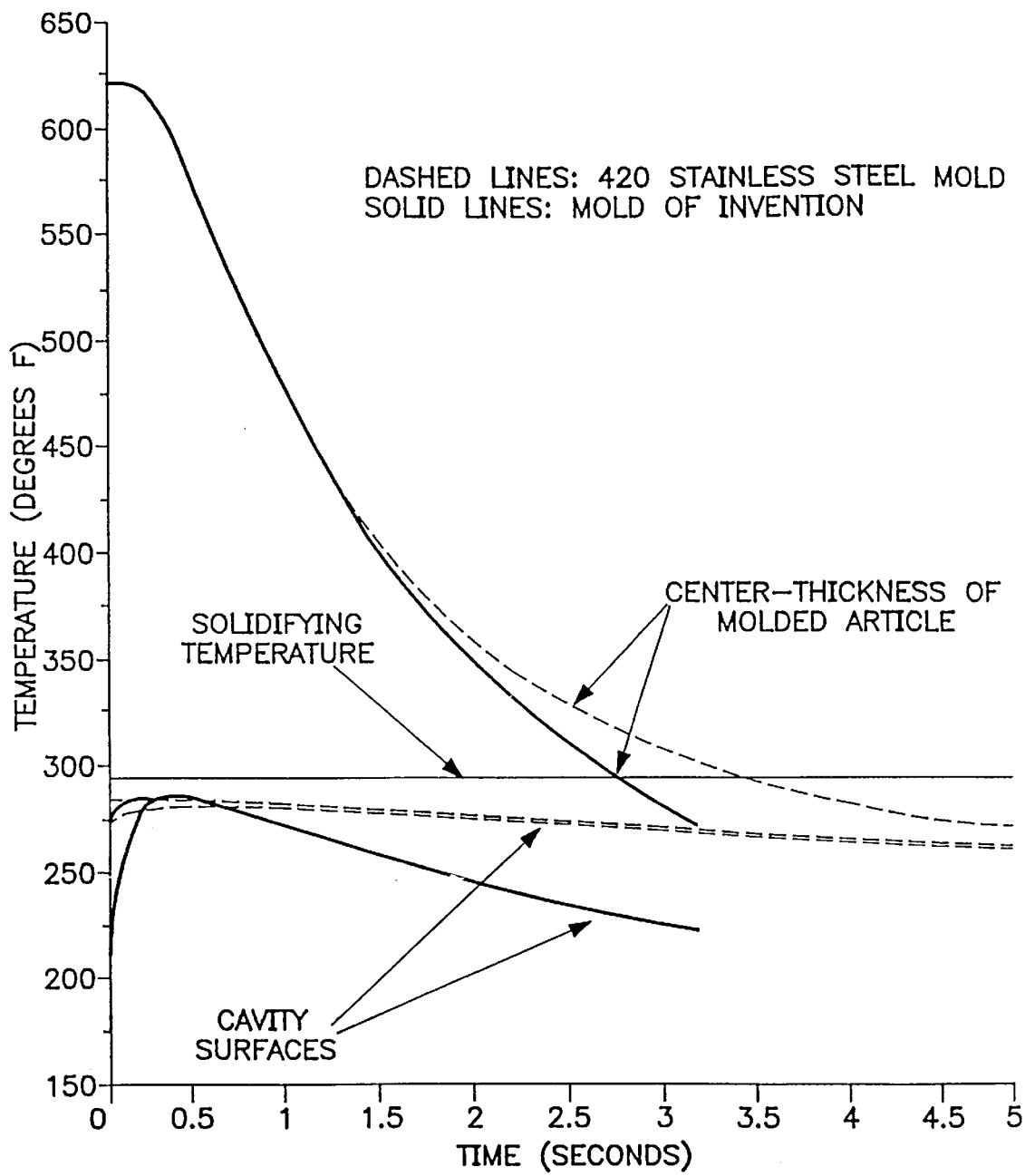
FIG. 5 Shows temperature histories for Example 5, which uses the mold of FIG. 2.

FIG. 5 shows the temperature histories for the center of the resin and the cavity surfaces for both the all-metal mold and the mold of the invention.

While several embodiments of the invention have been shown and described, it is to be understood that the invention is not limited to the specific examples, but is susceptible to changes and modifications known to persons skilled in the art. For example, the mold and methods can be adapted for use in casting, pressing, compression molding, injection molding, blow molding, and combinations of these. Plastics, metals, glass and ceramics may be molded according to the invention. The initial bulk temperature of the molten material can be increased compared to methods using common metal molds and the predetermined temperatures lowered even more than described in the examples. Whereas the invention is intended to encompass these and other variations, reference should be made to the appended claims to determine the scope of the invention in which exclusive rights are claimed.

What is claimed is:

1. A mold for optimizing molding time to form a molded article, said mold containing a plurality of mold portions forming a mold cavity having cavity surfaces in a shape of said molded article, said mold portions comprising:

(1) at least one mold die having at least one primary booster adjacent to and in thermal communication therewith, said mold die providing structural support for said primary booster;

(2) said primary booster being disposed in the mold cavity and forming at least a part of the cavity surfaces, the primary booster being made of material whose mathematical product of thermal conductivity, density, and specific heat is no more than $2.0 \times 10^{-6}$ BTU$^2$/sec/in$^4$/° F.$^2$ at room temperature, and having predetermined, thicknesses ($W_b$) as calculated from the equation $$W_b = Y \sqrt{\frac{k_b t_f}{\rho_b c_b}} \quad 0.25 \le Y \le 4.0$$

where $t_f$ is a time to fill the mold, $k_b$ is thermal conductivity, $\rho_b$ is density, and $C_b$ is specific heat of the primary booster; and, (3) thermal control means for applying temperature control stimuli to the mold die.

2. The mold of claim 1, wherein the primary boosters vary in thickness at different locations on the cavity surfaces.

3. The mold of claim 1, further comprising edge temperature boosters on the cavity surfaces, the edge temperature boosters being made of materials whose mathematical product of thermal conductivity, density, and specific heat is no more than $2.0 \times 10^{-6}$ BTU$^2$/sec/in$^4$/° F.$^2$ at room temperature.

4. The mold of claim 1, wherein the molded article is an optical disc.

5. The mold of claim 1, further comprising secondary boosters, the secondary boosters being located between at least a part of said primary boosters forming the cavity surfaces, and said mold dies, the secondary boosters being in thermal communication with both the primary boosters and the mold dies, the secondary boosters being made of materials whose mathematical product of thermal conductivity, density, and specific heat is less than that of the adjacent primary boosters, whereby the secondary boosters restrict heat flow from the primary boosters for improving build-up of heat in the primary boosters, the secondary boosters having thicknesses ($W_{sb}$) as calculated from the equation $$W_{sb} = Z\sqrt{\frac{k_{sb}t_f}{\rho_{sb}C_{sb}}} \quad 0.025 \le Z \le 4.0 \qquad 5$$

where $t_f$ is the time to fill the mold, $k_{sb}$ is the thermal conductivity, $\rho_{sb}$ is the density, and $C_{sb}$ is the specific heat of the secondary booster.

6. The mold of claim 5, wherein said primary and secondary boosters have differing thicknesses at different locations, causing different heat flow from the cavity surfaces to the mold dies at the different locations.

7. The mold of claim 5, further comprising a stamper forming at least a part of the cavity surfaces, said stamper being in thermal communication with at least one said primary booster.

8. The mold of claim 7, further comprising a stamper heating means.

9. A mold for optimizing molding time to form a molded article, said mold containing a plurality of mold portions forming a mold cavity having cavity surfaces in a shape of said molded article, said mold portions comprising:

(1) at least one mold die having at least one primary booster adjacent to and in thermal communication therewith, said mold die providing structural support for said primary booster;

(2) said primary booster being disposed in the mold cavity and forming at least a part of the cavity surfaces, the primary booster being made of material whose mathematical product of thermal conductivity, density, and specific heat is no more than $2.0 \times 10^6$ BTU$^2$/sec/in$^4$/F.$^2$ at room temperature, and having predetermined thicknesses ($W_b$) as calculated from the equation $$W_b = Y\sqrt{\frac{k_b t_f}{\rho_b C_b}} \quad 0.25 \le Y \le 4.0$$

where $t_f$ is a time to fill the mold, $k_b$ is thermal conductivity, $\rho_b$ is density, and $C_b$ is specific heat of the primary booster;

(3) thermal control means for applying temperature control stimuli to the mold die;

(4) a stamper forming at least a part of the cavity surfaces, said stamper being in thermal communication with at least one said primary booster; and, (5) a stamper heating means.

10. The mold of claim 9, wherein the heating means is at least partially thermally insulated from the mold die.

11. The mold of claim 9, wherein the heating means is electrical resistive heating.

12. The mold of claim 9, wherein the stamper heating means is located in the mold die substantially adjacent to a periphery of the primary booster and in thermal communication with the stamper.

13. The mold of claim 9, wherein the molded article is an optical disc.

14. The mold of claim 9, wherein the stamper heating means is located in the mold die of an optical disc mold in a vicinity of an outer diameter of the cavity and in thermal communication with the stamper.

* * * * *